US008031861B2

(12) United States Patent
Chandran et al.
(10) Patent No.: US 8,031,861 B2
(45) **Date of Patent: *Oct. 4, 2011**

(54) COMMUNICATION SYSTEM TONAL COMPONENT MAINTENANCE TECHNIQUES

(75) Inventors: Ravi Chandran, South Bend, IN (US); Daniel J. Marchok, Buchanan, MI (US); Bruce E. Dunne, Niles, MI (US)

(73) Assignee: Tellabs Operations, Inc., Naperville, IL (US)

( * ) Notice: Subject to any disclaimer, the term of this patent is extended or adjusted under 35 U.S.C. 154(b) by 826 days.

This patent is subject to a terminal disclaimer.

(21) Appl. No.: 12/072,500

(22) Filed: Feb. 26, 2008

(65) Prior Publication Data

US 2009/0129582 A1 May 21, 2009

Related U.S. Application Data

(63) Continuation of application No. 11/046,161, filed on Jan. 28, 2005, now Pat. No. 7,366,294, which is a continuation of application No. 09/710,827, filed on Nov. 13, 2000, now abandoned, which is a continuation of application No. 09/479,120, filed on Jan. 7, 2000, now Pat. No. 6,591,234.

(60) Provisional application No. 60/115,245, filed on Jan. 7, 1999.

(51) Int. Cl.
*H04M 7/00* (2006.01)
*H04M 1/00* (2006.01)
*H04M 5/00* (2006.01)

(52) U.S. Cl. .......................................................... 379/341

(58) Field of Classification Search .................. 379/341
See application file for complete search history.

(56) References Cited

U.S. PATENT DOCUMENTS 4,351,982 A 9/1982 Miller et al.

(Continued)

FOREIGN PATENT DOCUMENTS

EP 0856833 A3 2/1999

(Continued)

OTHER PUBLICATIONS

Special Mobile Group Technical Committee of ETSI: "Digital Cellular Telecommunications System (Phase 2) Full Rate Speech; Part 6: Voice Activity Detection (VAD) for Full Rate Speech Traffic Channels," *Draft ETS* 300 580-6 (Nov. 1997).

(Continued)

*Primary Examiner* — Alexander Jamal

(74) *Attorney, Agent, or Firm* — Hamilton, Brook, Smith & Reynolds, P.C.

(57) ABSTRACT

An apparatus and method for suppressing noise is presented. The apparatus may utilize a filter bank of bandpass filters to split the input noisy speech-containing signal into separate frequency bands. To determine whether the input signal contains speech, DTMF tones or silence, a joint voice activity & DTMF activity detector (JVADAD) may be used. The overall average noise-to-signal ratio (NSR) of the input signal is estimated in the overall NSR estimator, which estimates the average noisy signal power in the input signal during speech activity and the average noise power during silence. Two indirect power measures are performed for each band, measuring a short-term power and a long-term power. The power estimation processes are adapted based on the signal activity indicated by the JVADAD. A NSR adapter adapts the NSR for each frequency band based on the long-term and short-term power measures, the overall NSR and the signal activity indicated by the JVADAD. The NSR adaptation may then be performed. The gain computer utilizes these NSR values to determine the gain factors for each frequency band. The gain multiplier may then perform the attenuation of each frequency band. Finally, the processed signals in the separate frequency bands are summed up in the combiner to produce the clean output signal. In another embodiment of the present invention, a method for suppressing noise is presented. An alternative embodiment of the present invention includes a method and apparatus for extending DTMF tones. Yet another embodiment of the present invention includes regenerating DTMF tones.

21 Claims, 8 Drawing Sheets

U.S. PATENT DOCUMENTS

| | | | | | |
|---|---|---|---|---|---|
| 4,351,983 | A | | 9/1982 | Crouse | |
| 4,423,289 | A | | 12/1983 | Swinbanks | |
| 4,454,609 | A | | 6/1984 | Kates | |
| 4,628,529 | A | | 12/1986 | Borth et al. | |
| 4,630,304 | A | | 12/1986 | Borth et al. | |
| 4,630,305 | A | | 12/1986 | Borth et al. | |
| 4,658,426 | A | | 4/1987 | Chabries et al. | |
| 4,658,435 | A | * | 4/1987 | Childress et al. | 455/17 |
| 4,769,847 | A | | 9/1988 | Taguchi | |
| 5,012,519 | A | | 4/1991 | Adlersberg et al. | |
| 5,285,165 | A | | 2/1994 | Renfors et al. | |
| 5,351,271 | A | * | 9/1994 | Coquerel | 375/224 |
| 5,400,409 | A | | 3/1995 | Linhard | |
| 5,425,105 | A | | 6/1995 | Lo et al. | |
| 5,432,859 | A | | 7/1995 | Yang et al. | |
| 5,485,524 | A | | 1/1996 | Kuusama et al. | |
| 5,533,118 | A | | 7/1996 | Cesaro et al. | |
| 5,610,991 | A | | 3/1997 | Janse | |
| 5,619,524 | A | | 4/1997 | Ling et al. | |
| 5,632,003 | A | | 5/1997 | Davidson et al. | |
| 5,706,395 | A | | 1/1998 | Arslan et al. | |
| 5,748,725 | A | | 5/1998 | Kubo | |
| 5,806,025 | A | | 9/1998 | Vis et al. | |
| 6,263,307 | B1 | | 7/2001 | Arslan et al. | |
| 6,377,919 | B1 | | 4/2002 | Burnett et al. | |

FOREIGN PATENT DOCUMENTS

| | | |
|---|---|---|
| WO | WO 89/03141 | 4/1989 |
| WO | WO 96/24128 | 8/1996 |

OTHER PUBLICATIONS

J.S. Lim & A.V. Oppenheim: “Enhancement and Bandwidth Compression of Noisy Speech,” *Proceedings of the IEEE*, vol. 67, No. 12, pp. 7-25 (Dec. 1979).

M. Berouti, R. Schwartz & J. Makhoul: “Enhancement of Speech Corrupted by Acoustic Noise,” *Proceedings of the IEEE Conference on Acoustics, Speech, and Sig. Proc.*, pp. 208-211 (Apr. 1971).

J.R. Deller et al., “Discrete-Time Processing of Speech Signals,” chapter 7. Prentice Hall Inc. (1987).

Saeed V. Vaseghi, “Advanced Signal Processing and Digital Noise Reduction,” Chapter 9, pp. 242-260, ISBN WILEY 0471958751 (1996).

Kondoz et al., “A High Quality Voice Coder with Integrated Echo Canceller and Voice Activity Detector for VSAT Systems,” *3rd European Conference on Satellite Communications-ECSC-3*, pp. 196-200 (1993).

Gagnon et al., “Speech Processing Using Resonator Filterbanks,” *Proc. IEEE International Conference on Accoustics, Speech & Signal Processing*, pp. 981-984 (May 14-17, 1991).

Little, et al, “Speech Recognition for the Siemens EWSD Public Exchange,” *Proc. of 1998 IEEE 4th workshop; Interactive Voice Technology for Telecommunications Applications, IVT*, pp. 175-178 (1998).

Mcaulay et al, “Speech Enhancement Using a Soft-Decision Noise Suppression Filter,” *IEEE Transactions on ASSP*, vol ASP-28, No. 2, pp. 137-145 (Apr. 1980).

Texas Instruments Application Report, “DTMF Tone Generation and Detection: An Implementation Using the TMS320C54x,” pp. 5-12, 20. A-1,. A-2, B-1, B2 (1997).

Roman Kuc: *Introduction to Digital Signal Processing*, Chapter 9.5, pp. 361-379 (ISBN 0070355703), (1988).

* cited by examiner

COMMUNICATION SYSTEM TONAL COMPONENT MAINTENANCE TECHNIQUES

RELATED APPLICATIONS

This application is a continuation of U.S. application Ser. No. 11/046,161, filed Jan. 28, 2005 now U.S. Pat. No. 7,366, 294, which is a continuation of U.S. application Ser. No. 09/710,827, filed Nov. 13, 2000 now abandoned, which is a continuation of U.S. application Ser. No. 09/479,120, filed Jan. 7, 2000 now U.S. Pat. No. 6,591,234, which claims the benefit of U.S. Provisional Application No. 60/115,245, filed Jan. 7, 1999.

The entire teachings of the above application(s) are incorporated herein by reference.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The present invention relates to suppressing noise in telecommunications systems. In particular, the present invention relates to suppressing noise in single channel systems or single channels in multiple channel systems.

Speech quality enhancement is an important feature in speech communication systems. Cellular telephones, for example, are often operated in the presence of high levels of environmental background noise present in moving vehicles. Background noise causes significant degradation of the speech quality at the far end receiver, making the speech barely intelligible. In such circumstances, speech enhancement techniques may be employed to improve the quality of the received speech, thereby increasing customer satisfaction and encouraging longer talk times.

Past noise suppression systems typically utilized some variation of spectral subtraction. FIG. 1 shows an example of a noise suppression system 100 that uses spectral subtraction. A spectral decomposition of the input noisy speech-containing signal 102 is first performed using the filter bank 104. The filter bank 104 may be a bank of bandpass filters such as, for example, the bandpass filters disclosed in R. J. McAulay and M. L. Malpass, "Speech Enhancement Using a Soft-Decision Noise Suppression Filter," *IEEE Trans. Acoust., Speech, Signal Processing*, vol. ASSP-28, no. 2, (April 1980), pp. 137-145. In this context, noise refers to any undesirable signal present in the speech signal including: 1) environmental background noise; 2) echo such as due to acoustic reflections or electrical reflections in hybrids; 3) mechanical and/or electrical noise added due to specific hardware such as tape hiss in a speech playback system; and 3) non-linearities due to, for example, signal clipping or quantization by speech compression.

The filter bank 104 decomposes the signal into separate frequency bands. For each band, power measurements are performed and continuously updated over time in the noisy signal power & noise power estimator 106. These power measures are used to determine the signal-to-noise ratio (SNR) in each band. The voice activity detector 108 is used to distinguish periods of speech activity from periods of silence. The noise power in each frequency band is updated only during silence while the noisy signal power is tracked at all times. For each frequency band, a gain (attenuation) factor is computed in the gain computer 110 based on the SNR of the band to attenuate the signal in the gain multiplier 112. Thus, each frequency band of the noisy input speech signal is attenuated based on its SNR. In this context, speech signal refers to an audio signal that may contain speech, music or other information bearing audio signals (e.g., DTMF tones, silent pauses, and noise).

A more sophisticated approach may also use an overall SNR level in addition to the individual SNR values to compute the gain factors for each band. The overall SNR is estimated in the overall SNR estimator 114. The gain factor computations for each band are performed in the gain computer 110. The attenuation of the signals in different bands is accomplished by multiplying the signal in each band by the corresponding gain factor in the gain multiplier. Low SNR bands are attenuated more than the high SNR bands. The amount of attenuation is also greater if the overall SNR is low. The possible dynamic range of the SNR of the input signal is large. As such, the speech enhancement system must be capable of handling both very clean speech signals from wireline telephones as well as very noisy speech from cellular telephones. After the attenuation process, the signals in the different bands are recombined into a single, clean output signal 116. The resulting output signal 116 will have an improved overall perceived quality.

In this context, speech enhancement system refers to an apparatus or device that enhances the quality of a speech signal in terms of human perception or in terms of another criteria such as accuracy of recognition by a speech recognition device, by suppressing, masking; canceling or removing noise or otherwise reducing the adverse effects of noise. Speech enhancement systems include apparatuses or devices that modify an input signal in ways such as, for example: 1) generating a wider bandwidth speech signal from a narrow bandwidth speech signal; 2) separating an input signal into several output signals based on certain criteria, e.g., separation of speech from different speakers where a signal contains a combination of the speakers' speech signals; 3) and processing (for example by scaling) different "portions" of an input signal separately and/or differently, where a "portion" may be a portion of the input signal in time (e.g., in speaker phone systems) or may include particular frequency bands (e.g., in audio systems that boost the base), or both.

The decomposition of the input noisy speech-containing signal can also be performed using Fourier transform techniques or wavelet transform techniques. FIG. 2 shows the use of discrete Fourier transform techniques (shown as the Windowing & FFT block 202). Here a block of input samples is transformed to the frequency domain. The magnitude of the complex frequency domain elements are attenuated at the attenuation unit 208 based on the spectral subtraction principles described above. The phase of the complex frequency domain elements are left unchanged. The complex frequency domain elements are then transformed back to the time domain via an inverse discrete Fourier transform in the IFFT block 204, producing the output signal 206. Instead of Fourier transform techniques, wavelet transform techniques may be used to decompose the input signal.

A voice activity detector may be used with noise suppression systems. Such a voice activity detector is presented in, for example, U.S. Pat. No. 4,351,983 to Crouse et al. In such detectors, the power of the input signal is compared to a variable threshold level. Whenever the threshold is exceeded, the system assumes speech is present. Otherwise, the signal is assumed to contain only background noise.

For most implementations of speech enhancement, it is desirable to minimize processing delay. As such, the use of Fourier or wavelet transform techniques for spectral decomposition is undesirable because these techniques introduce large delays when accumulating a block of samples for processing.

Low computational complexity is also desirable as the network noise suppression system may process multiple independent voice channels simultaneously. Furthermore, limiting the types of computations to addition, subtraction and multiplication is preferred to facilitate a direct digital hardware implementation as well as to minimize processing in a fixed-point digital signal processor-based implementation. Division is computationally intensive in digital signal processors and is also cumbersome for direct digital hardware implementation. Finally, the memory storage requirements for each channel should be minimized due to the need to process multiple independent voice channels simultaneously.

Speech enhancement techniques must also address information tones such as DTMF (dual-tone multi-frequency) tones. DTMF tones are typically generated by push-button/tone-dial telephones when any of the buttons are pressed. The extended touch-tone telephone keypad has 16 keys: (1, 2, 3, 4, 5, 6, 7, 8, 9, 0, *, #, A, B, C, D). The keys are arranged in a four by four array. Pressing one of the keys causes an electronic circuit to generate two tones. As shown in Table 1, there is a low frequency tone for each row and a high frequency tone for each column. Thus, the row frequencies are referred to as the Low Group and the column frequencies, the High Group. In this way, sixteen unique combinations of tones can be generated using only eight unique tones. Table 1 shows the keys and the corresponding nominal frequencies. (Although discussed with respect to DTMF tones, the principles discussed with respect to the present invention are applicable to all inband signals. In this context, an inband signal refers to any kind of tonal signal within the bandwidth normally used for voice transmission such as, for example, facsimile tones, dial tones, busy signal tones, and DTMF tones).

TABLE 1

Touch-tone keypad row (Low Group) and column (High Group) frequencies

| Low\High (Hz) | 1209 | 1336 | 1477 | 1633 |
|---|---|---|---|---|
| 697 | 1 | 2 | 3 | A |
| 770 | 4 | 5 | 6 | B |
| 852 | 7 | 8 | 9 | C |
| 941 | * | 0 | # | D |

DTMF tones are typically less than 100 milliseconds (ms) in duration and can be as short as 45 ms. These tones may be transmitted during telephone calls to automated answering systems of various kinds. These tones are generated by a separate DTMF circuit whose output is added to the processed speech signal before transmission.

In general, DTMF signals may be transmitted at a maximum rate of ten digits/second. At this maximum rate, for each 100 ms timeslot, the dual tone generator must generate touch-tone signals of duration at least 45 ms and not more than 55 ms, and then remain quiet during the remainder of the timeslot. When not transmitted at the maximum rate, a tone pair may last any length of time, but each tone pair must be separated from the next pair by at least 40 ms.

In past speech enhancement systems, however, DTMF tones were often partially suppressed. Suppression of DTMF tones occurred because voice activity detectors and/or DTMF tone detectors require some delay before they were able to determine the presence of a signal. Once the presence of a signal was detected, there was still a lag time before the gain factors for the appropriate frequency bands reached their correct (high) values. This reaction time often caused the initial part of the tones to be heavily suppressed. Hence short-duration DTMF tones may be shortened even further by the speech enhancement system. FIG. 7 shows an input signal 702 containing a 697 Hz tone 704 of duration 45 ms (360 samples). The output signal 706 is heavily suppressed initially, until the voice activity detector detects the signal presence. Then, the gain factor 708 gradually increases to prevent attenuation. Thus, the output is a shortened version of the input tone, which in this example, does not meet general minimum duration requirements for DTMF tones.

As a result of the shortening of the DTMF tones, the receiver may not detect the DTMF tones correctly due to the tones failing to meet the minimum duration requirements. As can be seen in FIG. 7 the gain factor 708 never reaches its maximum value of unity because it is dependent on the SNR of the band. This causes the output signal 706 to be always attenuated slightly, which may be sufficient to prevent the signal power from meeting the threshold of the receiver's DTMF detector. Furthermore, the gain factors for different frequency bands may be sufficiently different so as to increase the difference in the amplitudes of the dual tones. This further increases the likelihood that the receiver will not correctly detect the DTMF tones.

The shortcomings discussed above were present in past noise suppression systems. The system disclosed in, for example, in U.S. Pat. Nos. 4,628,529, 4,630,304, and 4,630,305 to Borth et al. was designed to operate in high background noise environments. However, operation under a wide range of SNR conditions is preferable. Furthermore, software division is used in Borth's methods. Computationally intensive division operations are also used in U.S. Pat. No. 4,454,609 to Kates. The use of minimum mean-square error log-spectral amplitude estimators such as that disclosed in U.S. Pat. No. 5,012,519 to Adlersberg et al. are also computationally intensive. Furthermore, the system disclosed in Adlersberg uses Fourier transforms for spectral decomposition that introduce undesirable delay. Moreover, although a DTMF tone generator is presented in Texas Instruments Application Report, "DTMF Tone Generation and Detection: An Implementation Using the TMS320C54x," 1997, pp. 5-12, 20, A-1, A-2, B-1, B-2, there are no systems that extend and/or regenerate suppressed DTMF tones.

A need has long existed in the industry for a noise suppression system having low computational complexity. Moreover, a need has long existed in the industry for a noise suppression system capable of extending and/or regenerating partially suppressed DTMF tones.

BRIEF SUMMARY OF THE INVENTION

The invention is useful in a communication system adapted to transmit a communication signal comprising an input speech component and an input tonal component. In such an environment, according to an apparatus embodiment of the invention, maintaining the input tonal component is aided by apparatus comprising an input for receiving the communication signal. A processor is arranged to detect the input tonal component, generate a second tonal component independent of the input tonal component in response to the input tonal component and generate an output signal responsive to the input signal. The output signal comprises at least in part the second tonal component. An output is provided for transmitting the output signal, including the second tonal component.

According to a method embodiment of the invention, maintaining the input tonal component is aided by: receiving the communication signal; detecting the input tonal component; generating a second tonal component independent of the input tonal component in response to the input tonal component; generating an output signal responsive to the input signal, the output signal comprising at least in part the second tonal component; and transmitting the output signal, including the second tonal component.

DETAILED DESCRIPTION OF THE INVENTION

Figure 1:
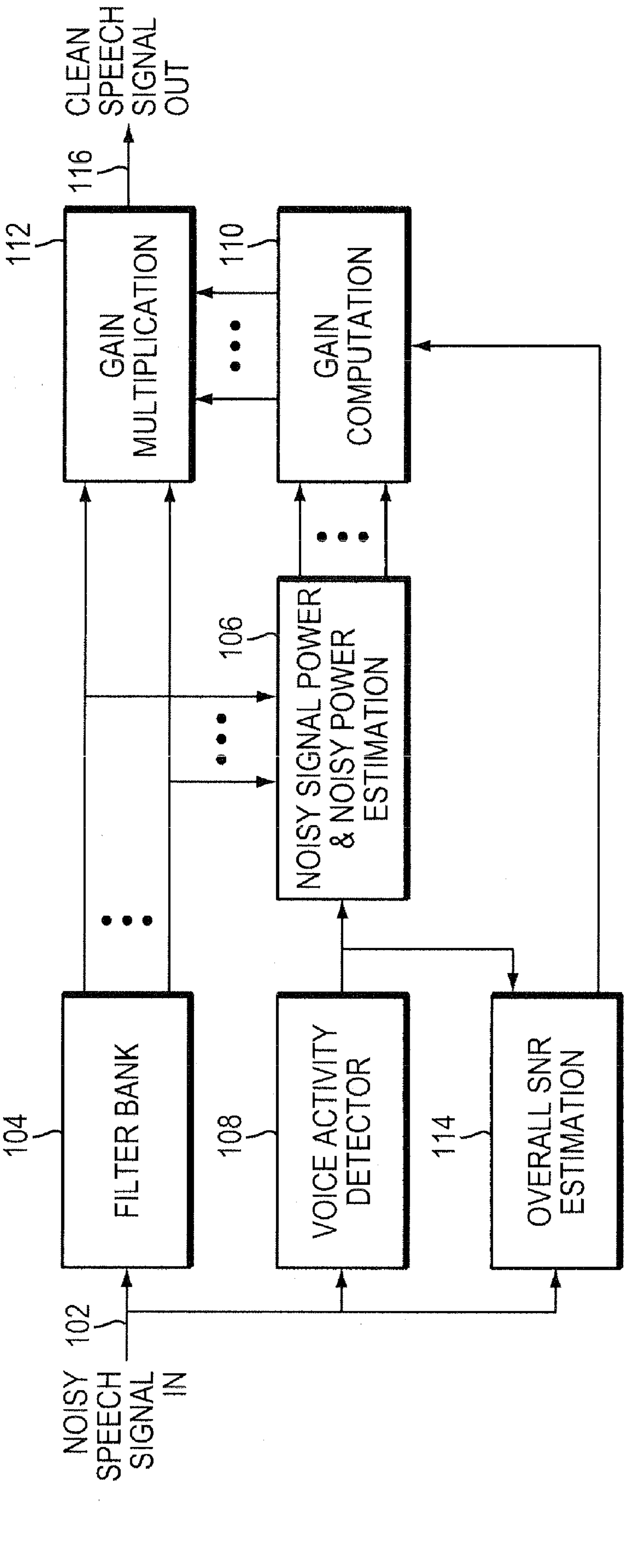
FIG. 1 presents a block diagram of a typical noise suppression system.
Figure 2:
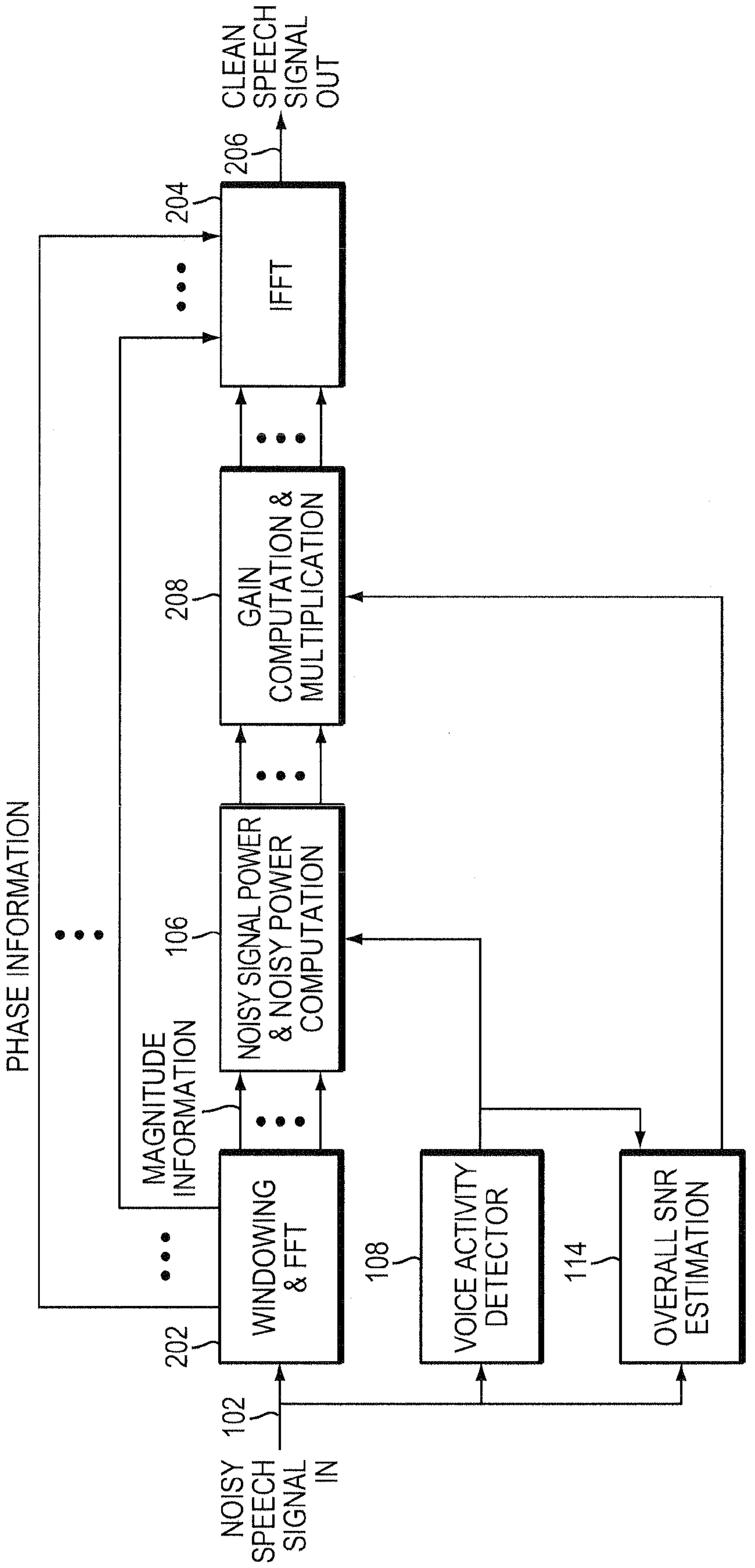
FIG. 2 presents a block diagram of another typical noise suppression system.
Figure 3:
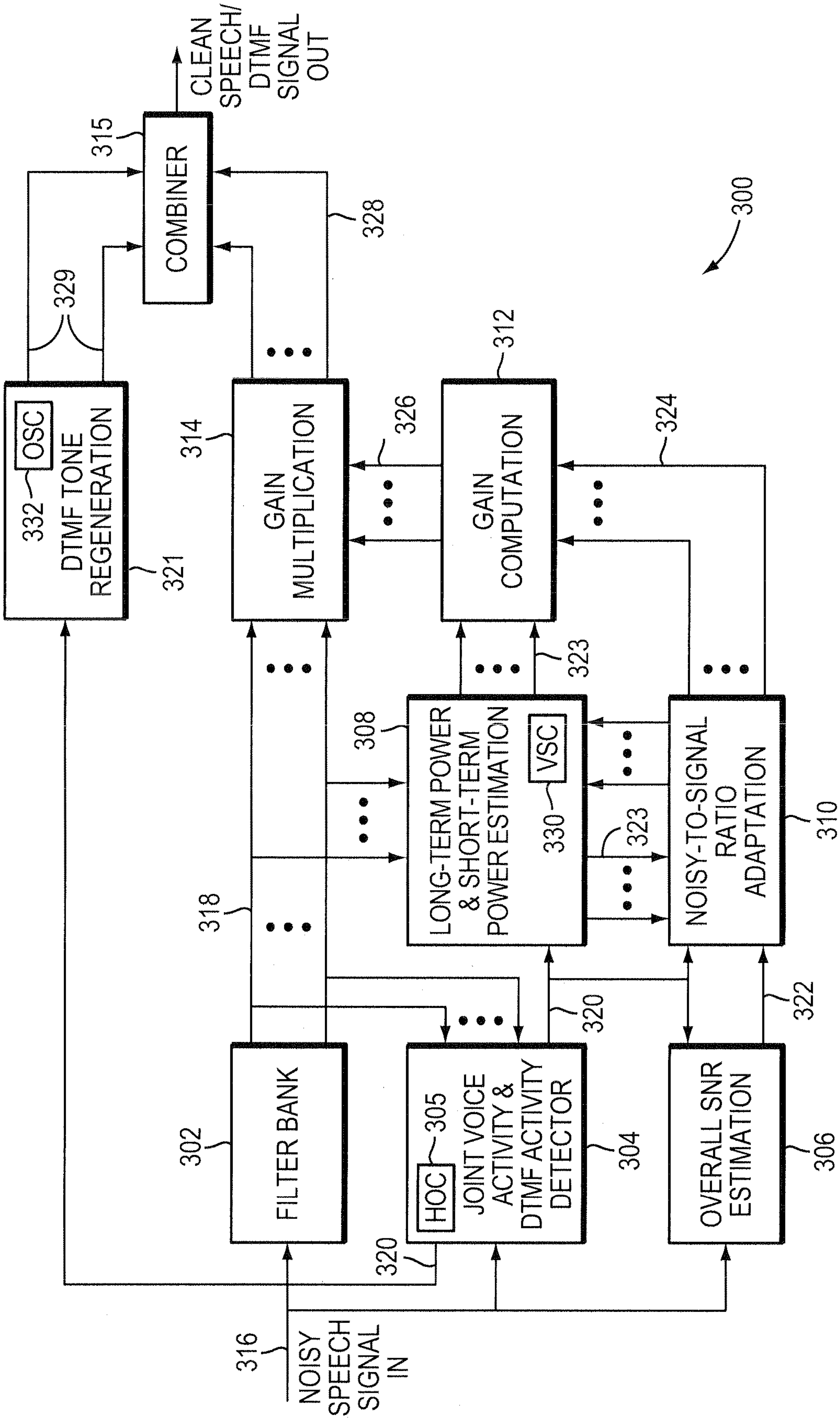
FIG. 3 presents a block diagram of a noise suppression apparatus according to a particular embodiment of the present invention.

Turning now to FIG. 3, that Figure presents a block diagram of a noise suppression apparatus 300. A filter bank 302, voice activity detector 304, a hangover counter 305, and an overall NSR (noise to signal ratio) estimator 306 are presented. A power estimator 308, NSR adapter 310, gain computer 312, a gain multiplier 314 and a combiner 315 are also present. The embodiment illustrated in FIG. 3 also presents an input signal x(n) 316 and output signals $x_k$(n) 318, a joint voice activity detection and DTMF activity detection signal 320. FIG. 3 also presents a DTMF tone generator 321. The output from the overall NSR estimator 306 is the overall NSR ("$NSR_{overall}$(n)") 322. The power estimates 323 are output from the power estimator 308. The adapted NSR values 324 are output from the NSR adapter 310. The gain factors 326 are output from the gain computer 312. The attenuated signals 328 are output from the gain multiplier 314. The regenerated DTMF tones 329 are output from the DTMF tone generator 321. FIG. 3 also illustrates that the power estimator 308 may optionally include an undersampling circuit 330 and that the power estimator 308 may optionally output the power estimates 323 to the gain computer 312.

In the illustrated embodiment of FIG. 3, the filter bank 302 receives the input signal 316. The sampling rate of the speech signal in, for example, telephony applications is normally 8 kHz with a Nyquist bandwidth of 4 kHz. Since the transmission channel typically has a 300-3400 Hz range, the filter bank 302 may be designed to only pass signals in this range. As an example, the filter bank 302 may utilize a bank of bandpass filters. A multirate or single rate filter bank 302 may be used. One implementation of the single rate filter bank 302 uses the frequency-sampling filter (FSF) structure. The preferred embodiment uses a resonator bank which consists of a series of low order infinite impulse response ("IIR") filters. This resonator bank can be considered a modified version of the FSF structure and has several advantages over the FSF structure. The resonator bank does not require the memory-intensive comb filter of the FSF structure and requires fewer computations as a result. The use of alternating signs in the FSF structure is also eliminated resulting in reduced computational complexity. The transfer function of the $k^{th}$ resonator may be given by, for example:

$$H_k(z) = \frac{g_k[1 - r_k\cos(\theta_k)z^{-1}]}{[1 - 2r_k\cos(\theta_k)z^{-1} + r^2z^{-2}]} \quad (1)$$

In equation (1), the center frequency of each resonator is specified through $\theta_k$. The bandwidth of the resonator is specified through $r_k$. The value of $g_k$ is used to adjust the DC gain of each resonator. For a resonator bank consisting of 40 resonators approximately spanning the 300-3400 Hz range, the following are suitable specifications for the resonator transfer functions with k=3, 4 . . . 42:

$$r_k = 0.965 \quad (2a)$$

$$\theta_k = \frac{2\pi k}{100} \quad (2b)$$

$$g_k = 0.01 \quad (2c)$$

The input to the resonator bank is denoted x(n) while the output of the $k^{th}$ resonator is denoted $x_k$(n), where n is the sample time.

The gain factor 326 for the $k^{th}$ frequency band may be computed once every T samples as:

$$G_k(n) = \begin{cases} 1 - NSR_k(n), & n = 0, T, 2T, \ldots \\ G_k(n-1), & n = 1, 2, \ldots, T-1, T+1, \ldots, 2T-1, \ldots \end{cases} \quad (3)$$

When the gain factor 326 for each frequency band is computed once every T samples, the gain is "undersampled" since it is not computed for every sample. (As indicated by dashed lines in FIGS. 1-4, several different items of data, for example gain factors 326, may be output from the pertinent device. The several outputs preferably correspond to the several subbands into which the input signal 316 is split. The gain factor will range between a small positive value, ϵ, and 1 because the NSR values are limited to lie in the range [0,1-ϵ]. Setting the lower limit of the gain to E reduces the effects of "musical noise" and permits limited background signal transparency.

The attenuation of the signal $x_k$(n) from the $k^{th}$ frequency band is achieved by multiplying $x_k$(n) by its corresponding gain factor, $G_k$(n), every sample. The sum of the resulting attenuated signals, y(n), is the clean output signal 328. The sum of the attenuated signals 328 may be expressed mathematically as:

$$y(n) = \sum_k G_k(n)x_k(n) \tag{4}$$

The attenuated signals 328 may also be scaled, for example boosted or amplified, for further transmission.

The power, P(n) at sample n, of a discrete-time signal u(n), is estimated approximately by lowpass filtering the full-wave rectified signal. A first order IIR filter may be used for the lowpass filter, such as, for example:

$$P(n)=\beta P(n-1)+\alpha|u(n)| \tag{5}$$

This IIR filter has the following transfer function:

$$H(z) = \frac{\alpha}{1-\beta z^{-1}} \tag{6}$$

The DC gain of this filter is $$H(1) = \frac{\alpha}{1-\beta}.$$

The coefficient, β, is referred to as a decay constant. The value of the decay constant determines how long it takes for the present (non-zero) value of the power to decay to a small fraction of the present value if the input is zero, i.e. u(n)=0. If the decay constant, β, is close to unity, then it will take a relatively long time for the power value to decay. If β is close to zero, then it will take a relatively short time for the power value to decay. Thus, the decay constant also represents how fast the old power value is forgotten and how quickly the power of the newer input samples is incorporated. Thus, larger values of β result in a longer effective averaging window. In this context, power estimates 323 using a relatively long effective averaging window are long-term power estimates, while power estimates using a relatively short effective averaging window are short-term power estimates.

Depending on the signal of interest, a longer or shorter averaging may be appropriate for power estimation. Speech power, which has a rapidly changing profile, would be suitably estimated using a smaller β. Noise can be considered stationary for longer periods of time than speech. Noise power is therefore preferably accurately estimated by using a longer averaging window (large β).

The preferred embodiment for power estimation significantly reduces computational complexity by undersampling the input signal for power estimation purposes. This means that only one sample out of every T samples is used for updating the power P(n). Between these updates, the power estimate is held constant. This procedure can be mathematically expressed as $$P(n) = \begin{cases} \beta P(n-1) + \alpha|u(n)|, & n = 0, 2T, 3T, \ldots \\ P(n-1), & n = 1, 2, \ldots T-1, T+1, \ldots 2T-1, \ldots \end{cases} \tag{7}$$

This first order lowpass IIR filter is preferably used for estimation of the overall average background noise power, and a long-term and short-term power measure for each frequency band. It is also preferably used for power measurements in the VAD 304. Undersampling may be accomplished through the use of, for example, an undersampling circuit 330 connected to the power estimator 308.

The overall SNR ("$SNR_{overall}(n)$") at sample n is defined as:

$$SNR_{overall}(n) = \frac{P_{SIG}(n)}{P_{BN}(n)} \tag{8}$$

where $P_{SIG}(n)$ and $P_{BN}(n)$ are the average noisy signal power during speech and average background noise power during silence, respectively. The overall SNR is used to influence the amount of oversuppression of the signal in each frequency band. Oversuppression improves the perceived speech quality, especially under low overall SNR conditions. Oversuppression of the signal is achieved by using the overall SNR value to influence the NSR adapter 310. Furthermore, undersuppression in the case of high overall SNR conditions may be used to prevent unnecessary attenuation of the signal. This prevents distortion of the speech under high SNR conditions where the low-level noise is effectively masked by the speech. The details of the oversuppression and undersuppression are discussed below.

The average noisy signal power is preferably estimated during speech activity, as indicated by the VAD 304, according to the formula:

$$P_{SIG}(n) = \begin{cases} \beta_{SIG}P_{SIG}(n-1) + \alpha_{SIG}|x(n)|, & n = 0, 2T, 3T, \ldots \\ P_{SIG}(n-1), & n = 1, 2, \ldots T-1, T+1, \ldots 2T-1, \ldots \end{cases} \tag{9a}$$

where x(n) is the noisy speech-containing input signal.

The average background noise power is preferably estimated according to the formula:

$$P_{BN}(n) = \begin{cases} \max\begin{bmatrix} \beta_{BN}P_{BN}(n-1) + \\ \alpha_{BN}|x(n)|, P_{BN,max} \end{bmatrix}, & n = 0, 2T, 3T, \ldots \\ P_{BN}(n-1), & n = 1, 2, \ldots T-1, T+1, \ldots 2T-1, \ldots \end{cases} \tag{9b}$$

where $P_{BN}(n)$ is not allowed to exceed $P_{BN,max}(n)$.

During silence or DTMF tone activity as indicated by the VAD 304, the average noisy signal power measure is preferably maintained constant, i.e.:

$$P_{SIG}(n)=P_{SIG}(n-1) \tag{10a}$$

During speech or DTMF tone activity as indicated by the VAD, the average background noise power measure is preferably maintained constant, i.e.

$$P_{BN}(n)=P_{BN}(n-1) \quad (10b)$$

If the range of the input samples are normalized to ±1, suitable values for the constant parameters used in the preferred embodiment are $$P_{BN,max}=180/8159 \quad (11a)$$

$$\alpha_{SIG}=\alpha_{BN}=T/16000 \quad (11b)$$

$$\beta_{SIG}=\beta_{BN}=1-T/16000 \quad (11c)$$

where T=10 is one possible undersampling period.

The average background noise power level is preferably limited to $P_{BN,max}$ for two reasons. First, $P_{BN,max}$ represents the typical worst-case cellular telephony noise scenario. Second, $P_{SIG}(n)$ and $P_{BN}(n)$ will be used in the NSR adapter 310 to influence the adjustment of the NSR for each frequency band. Limiting $P_{BN}(n)$ provides a means to control the amount of influence the overall SNR has on the NSR value for each band.

In the preferred embodiment, the overall NSR 322 is computed instead of the overall SNR. The overall NSR 322 is more suitable for the adaptation of the individual frequency band NSR values. As a straightforward computation of the overall NSR 322 involves a computationally intensive division of $P_{BN}(n)$ by $P_{SIG}(n)$, the preferred embodiment uses an approach that provides a suitable approximation of the overall NSR 322. Furthermore, the definition of the NSR is extended to be negative to indicate very high overall NSR 322 levels as follows:

$$NSR_{overall}(n) = \begin{cases} \upsilon_1 P_{BN}(n), & P_{SIG}(n) < \kappa_1 P_{BN}(n) \\ \upsilon_2 P_{BN}(n), & P_{SIG}(n) \geq \kappa_2 P_{BN}(n) \\ \upsilon_3 [P_{BN}(n) - P_{SIG}(n)], & \kappa_2 P_{BN}(n) > P_{SIG}(n) \geq \kappa_3 P_{BN}(n) \end{cases} \quad (12a)$$

One embodiment of the invention uses $\nu_1=2.9127$, $\nu_2=1.45635$, $\nu_3=0.128$, $\kappa_1=10$, $\kappa_2=14$ and $\kappa_3=20$. In this case, the range of $NSR_{overall}(n)$ 322 is:

$$-0.128 \leqq NSR_{overall}(n) \leqq 0.064 \quad (12b)$$

The upper limit on $NSR_{overall}(n)$ 322 in this embodiment is caused by limiting $P_{BN}(n)$ to be at most $P_{BN,max}(n)$. The lower limit arises from the fact that $P_{BN}(n)-P_{SIG}(n) \geqq -1$. (Since it is assumed that the input signal range is normalized to ±1, both $P_{BN}(n)$ and $P_{SIG}(n)$ are always between 0 and 1.)

The long-term power measure, $P_{LT}^{k}(n)$ at sample n, for the $k^{th}$ frequency band is proportional to the actual noise power level in that band. It is an amplified version of the actual noise power level. The amount of amplification is predetermined so as to prevent or minimize underflow in a fixed-point implementation of the SIR filter used for the power estimation. Underflow can occur because the dynamic range of the input signal in a frequency band during silence is low. The long-term power for the $k^{th}$ frequency band is preferably estimated only during silence as indicated by the VAD 304 using the following first order lowpass IIR filter:

$$P_{LT}^{k}(n) = \begin{cases} \beta_{LT} P_{LT}^{k}(n-1) + \alpha_{LT}|x_k(n)|, & n = 0, 2T, 3T, \ldots \\ P_{LT}^{k}(n-1), & n = 1, 2, \ldots T-1, T+1, \ldots 2T-1, \ldots \end{cases} \quad (13)$$

In this case, the long-term power would not be updated during DTMF tone activity or speech activity. However, unlike voice, DTMF tone activity affects only a few frequency bands. Thus, in an alternative embodiment, the long-term power estimates corresponding to the frequency bands that do not contain the DTMF tones are updated during DTMF tone activity. In this embodiment, long-term power estimates for frequency bands containing the DTMF tones are maintained constant, i.e.:

$$P_{LT}^{k}(n)=P_{LT}^{k}(n-1). \quad (14)$$

Note that the long-term power measure is also preferably undersampled with a period T. A suitable undersampling period is T=10 samples. A suitable set of filter coefficients for equation (13) are:

$$\alpha_{LT}=T/160 \quad (15a)$$

$$\beta_{LT}=1-T/16000 \quad (15b)$$

In this embodiment, the DC gain of the long-term power measure filter is $H_{LT}(1)=100$. This large DC gain provides the necessary boost to prevent or minimize the possibility of underflow of the long-term power measure.

The short-term power estimate uses a shorter averaging window than the long-term power estimate. If the short-term power estimate was performed using an IIR filter with fixed coefficients as in equation (7), the power would likely vary rapidly to track the signal power variations during speech. During silence, the variations would be lesser but would still be more than that of the long-term power measure. Thus, the required dynamic range of this power measure would be high if fixed coefficients are used. However, by making the numerator coefficient of the IIR filter proportional to the NSR of the frequency band, the power measure is made to track the noise power level in the band instead. The possibility of overflow is reduced or eliminated, resulting in a more accurate power measure.

The preferred embodiment uses an adaptive first order IIR filter to estimate the short-term power, $P_{ST}^{k}(n)$ in the $k^{th}$ frequency band, once every T samples:

$$P_{ST}^{k}(n) = \begin{cases} \beta_{ST} P_{ST}^{k}(n-1) + \alpha_{ST} NSR_k(n)|x_k(n)|, & n = 0, 2T, 3T, \ldots \\ P_{ST}^{k}(n-1), & n = 1, 2, \ldots T-1, T+1, \ldots 2T-1, \ldots \end{cases} \quad (16)$$

where $NSR_k(n)$ is the noise-to-signal ratio (NSR) of the $k^{th}$ frequency band at sample n. This IIR filter is adaptive since the numerator coefficient in the transfer function of this filter is proportional to $NSR_k(n)$ which depends on time and is adapted in the NSR adapter 310. This power estimation is preferably performed at all times regardless of the signal activity indicated by the VAD 304.

A suitable undersampling period for the power measure may be, for example, T=10 samples. Suitable filter coefficients may be, for example:

$$\alpha_{ST}=1 \tag{17a}$$

$$\beta_{ST}=1-T/128. \tag{17b}$$

In this embodiment, the DC gain of the IIR filter used for the short-term power estimation is $H_{ST}(1)=12.8$.

The method of adaptation of the NSR values when DTMF tones are absent will now be discussed. The NSR of a frequency band is preferably adapted based on the long-term power, $P_{LT}(n)$, and the short-term power, $P_{ST}(n)$, corresponding to that band as well as the overall NSR, $NSR_{overall}(n)$ 322.

Figure 4:
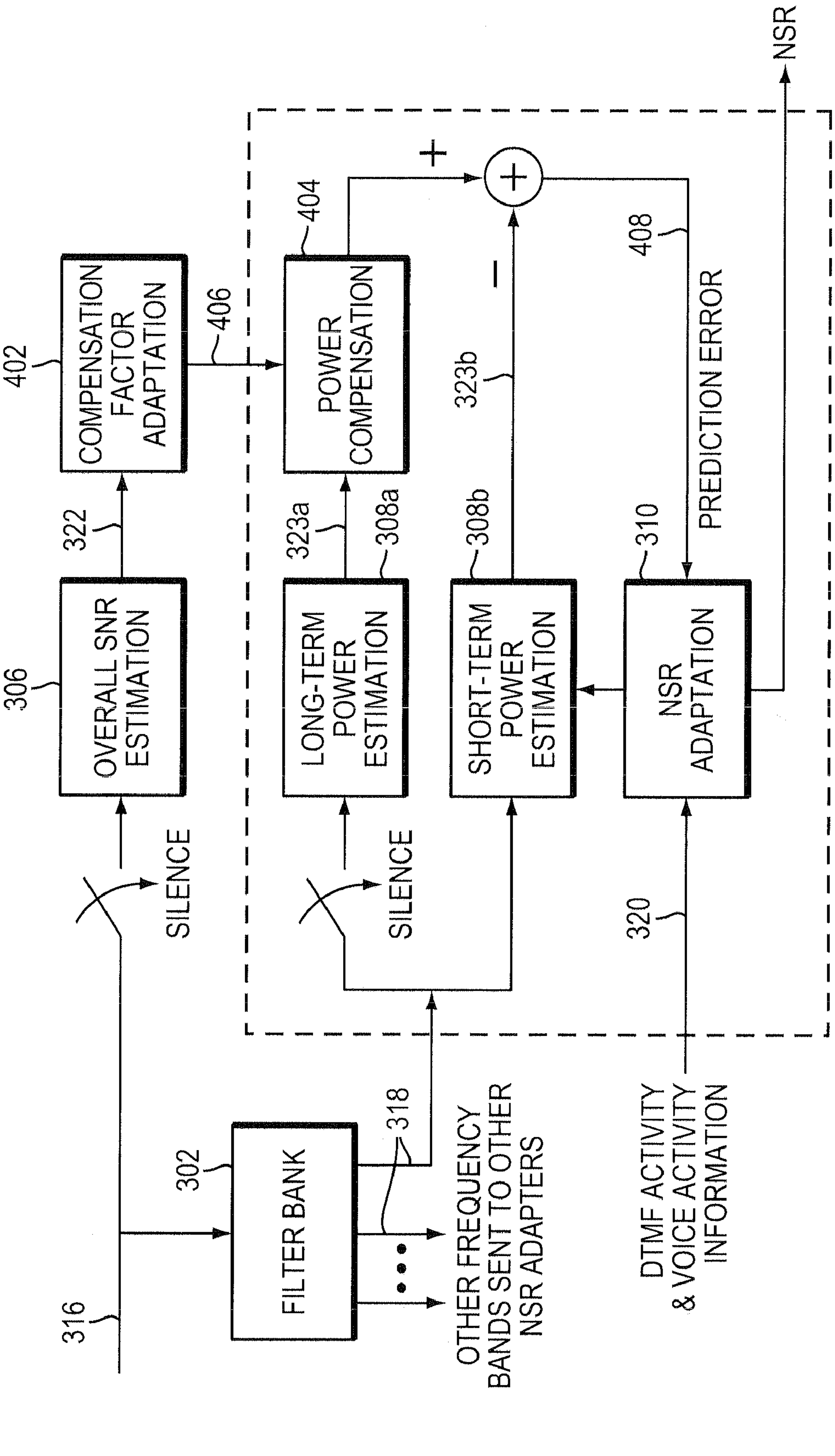
FIG. 4 presents a block diagram of an apparatus for determining NSR according to a particular embodiment of the present invention.

FIG. 4 illustrates the process of NSR adaptation for a single frequency band. FIG. 4 presents the compensation factor adapter 402, long term power estimator 308*a*, short term power estimator 308*b*, and power compensator 404. The compensation factor 406, long term power estimate 323*a*, and short term power estimate 323*b* are also shown. The prediction error 408 is also shown.

The overall NSR estimator 306 is common to all frequency bands. In the preferred embodiment, the compensation factor adapter 402 is also common to all frequency bands for computational efficiency. However, in general, the compensation factor adapter 402 may be designed to be different for different frequency bands. During silence, the short-term power estimate 323*b* in a frequency band is a measure of the noise power level. During speech, the short-term power 323*b* predicts the noise power level. Because background noise is almost stationary during short periods of time, the long-term power 323*a*, which is held constant during speech bursts, provides a good estimate of the true noise power preferably after compensation by a scalar. The scalar compensation is beneficial because the long-term power 323*a* is an amplified version of the actual noise power level. Thus, the difference between the short-term power 323*b* and the compensated long-term power provides a means to adjust the NSR. This difference is termed the prediction error 408. The sign of the prediction error 408 can be used to increase or decrease the NSR without performing a division.

The NSR adaptation for the $k^{th}$ frequency band can be performed in the NSR adapter 310 as follows during speech and silence (but preferably not during DTMF tone activity):

$$NSR_k(n) = \begin{cases} \max[0, NSR_k(n-1) - \Delta], & P_{ST}(n) - C(n)P_{LT}(n) > 0 \\ \min[1-\varepsilon, NSR_k(n-1) + \Delta], & \text{otherwise} \end{cases} \tag{18}$$

where the compensation factor (which is adapted in the compensation factor adapter) for the long-term power is given by:

$$C(n) = \frac{H_{ST}(1)}{H_{LT}(1)} + NSR_{overall}(n) \tag{19}$$

In equation (18), the sign of the prediction error 408, $P_{ST}(n)-C(N)P_{LT}(n)$, is used to determine the direction of adjustment of $NSR_k(n)$. In this embodiment, the amount of adjustment is determined based on the signal activity indicated by the VAD. The preferred embodiment uses a large Δ during speech and a small Δ during silence. Speech power varies rapidly and a larger Δ is suitable for tracking the variations quickly. During silence, the background noise is usually slowly varying and thus a small value of Δ is sufficient. Furthermore, the use of a small Δ value prevents sudden short-duration noise spikes from causing the NSR to increase too much, which would allow the noise spike to leak through the noise suppression system.

A suitable set of parameters for use in equation (18) when T=10 is given below:

$$\varepsilon = 0.05 \tag{20a}$$

$$\Delta = \begin{cases} 0.025 & \text{during speech} \\ 0.00625 & \text{during silence} \end{cases} \tag{20b}$$

In the preferred embodiment, the NSR adapter adapts the NSR according to the VAD state and the difference between the noise and signal power. Although this preferred embodiment uses only the sign of the difference between noise and signal power, the magnitude of this difference can also be used to vary the NSR. Moreover, the NSR adapter may vary the NSR according to one or more of the following: 1) the VAD state (e.g., a VAD flag indicating speech or noise); 2) the difference between the noise power and the signal power; 3) a ratio of the noise to signal power (instantaneous NSR); and 4) the difference between the instantaneous NSR and a previous NSR. For example, Δ may vary based on one or more of these four factors. By adapting Δ based on the instantaneous NSR, a "smoothing" or "averaging" effect is provided to the adapted NSR estimate. In one embodiment, Δ may be varied according to the following table (Table 1.1):

TABLE 1.1

Look-up Table for possible values of Δ used to vary the adapted NSR

| | Magnitude of difference between a previous NSR and an instantaneous NSR during speech | Δ |
|---|---|---|
| During speech | $\|difference\| < 0.025$ | 0 |
| | $0.025 < \|difference\| \leqq 0.3$ | 0.025 |
| | $\|difference\| > 0.3$ | 0.05 |
| During silence | $\|difference\| < 0.00625$ | 0 |
| | $0.00625 < \|difference\| \leqq 0.3$ | 0.00625 |
| | $\|difference\| > 0.3$ | 0.01 |

The overall NSR, $NSR_{overall}(n)$ 322, also may be a factor in the adaptation of the NSR through the compensation factor C(n) 406, given by equation (19). A larger overall NSR level results in the overemphasis of the long-term power 323*a* for all frequency bands. This causes all the NSR values to be adapted toward higher levels. Accordingly, this would cause the gain factor 326 to be lower for higher overall NSR levels. The perceived quality of speech is improved by this oversuppression under higher background noise levels.

When the $NSR_{overall}(n)$ 322 is negative, which happens under very high overall SNR conditions, the NSR value for each frequency band in this embodiment is adapted toward zero. Thus, undersuppression of very low levels of noise is achieved because such low levels of noise are effectively masked by speech. The relationship between the overall NSR 322 and the adapted NSR 324 in the several frequency bands can be described as a proportional relationship because as the overall NSR 322 increases, the adapted NSR 324 for each band increases.

In the preferred embodiment, $H_{LT}(1)=100$ and $H_{ST}(1)=12.8$, so that $H_{ST}(1)/H_{LT}(1)=0.128$ in equation (19). Since $-0.128 \leqq NSR_{overall}(n) \leqq 0.064$, the range of the compensation factor is:

$$0 \leqq C(M) \leqq 0.192 \tag{21}$$

Thus, in this embodiment, the long-term power is overemphasized by at most 1.5 times its actual value under low SNR conditions. Under high SNR conditions, the long-term power is de-emphasized whenever $C(n) \leqq 0.128$.

During DTMF tone activity as indicated by the VAD 304, the process of adapting the NSR values using equations (18) and (19) for the frequency bands containing the tones is not appropriate. For the bands that do not contain the active DTMF tones, (18) and (19) are preferably continued to be used during DTMF tone activity.

As soon as DTMF activity is detected, the NSR values for the frequency bands containing DTMF tones are preferably set to zero until the DTMF activity is no longer detected. After the end of DTMF activity, the NSR values may be allowed to adapt as described above.

Figure 9:
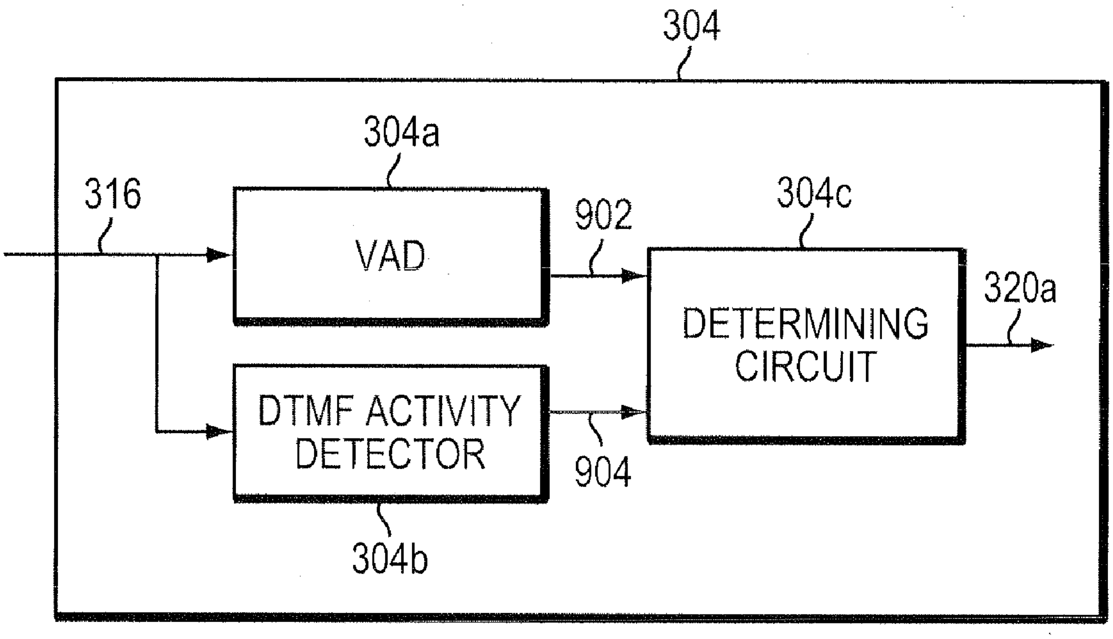
FIG. 9 presents a block diagram of a joint voice activity and DTMF activity detector according to a particular embodiment of the present invention.

The voice activity detector ("VAD") 304 determines whether the input signal contains either speech or silence. Preferably, the VAD 304 is a joint voice activity and DTMF activity detector ("JVADAD"). The voice activity and DTMF activity detection may proceed independently and the decisions of the two detectors are then combined to form a final decision. For example, as shown in FIG. 9, the JVADAD 304 may include a voice activity detector 304*a*, a DTMF activity detector 304*b*, and a determining circuit 304*c*. In one embodiment, the VAD 304*a* outputs a voice detection signal 902 to the determining circuit 304*c* and the DTMF activity detector outputs a DTMF detection signal 904 to the determining circuit 304*c*. The determining circuit 304*c* then determines, based upon the voice detection signal 902 and DTMF detection signal 904, whether voice, DTMF activity or silence is present in the input signal 316. The determining circuit 304*c* may determine the content of the input signal 316, for example, based on the logic presented in Table 2 (below). In this context, silence refers to the absence of speech or DTMF activity, and may include noise.

The voice activity detector may output a single flag, VAD 320, which is set, for example, to one if speech is considered active and zero otherwise. The DTMF activity detector sets a flag, for example DTMF=1, if DTMF activity is detected and sets DTMF=0 otherwise. The following table (Table 2) presents the logic that may be used to determine whether DTMF activity or speech activity is present:

TABLE 2

Logic for use with JVADAD

| DTMF | VAD | Decision |
|---|---|---|
| 0 | 0 | Silence |
| 0 | 1 | Speech |
| 1 | 0 | DTMF activity present |
| 1 | 1 | DTMF activity present |

When a tone-dial telephone button is pressed, a pair of tones are generated. One of the tones will belong to the following set of frequencies: {697, 770, 852, 941} in Hz and one will be from the set {1209, 1336, 1477, 1633} in Hz, as indicated above in Table 1. These sets of frequencies are termed the low group and the high group frequencies, respectively. Thus, sixteen possible tone pairs are possible corresponding to 16 keys of an extended telephone keypad. The tones are required to be received within ±2% of these nominal values. Note that these frequencies were carefully selected so as to minimize the amount of harmonic interaction. Furthermore, for proper detection of a pair of tones, the difference in amplitude between the tones (called 'twist') must be within 6 dB.

A suitable DTMF detection algorithm for detection of DTMF tones in the JVADAD 304 is a modified version of the Goertzel algorithm. The Goertzel algorithm is a recursive method of performing the discrete Fourier transform (DFT) and is more efficient than the DFT or FFT for small numbers of tones. The detection of DTMF tones and the regeneration and extension of DTMF tones will be discussed in more detail below.

Voice activity detection is preferably performed using the power measures in the first formant region of the input signal x(n). In the context of the telephony speech signal, the first formant region is defined to be the range of approximately 300-850 Hz. A long-term and short-term power measure in the first formant region are used with difference equations given by:

$$P_{1st,ST}(n) = \beta_{1st,ST} P_{1st,ST}(n-1) + \alpha_{1st,ST} \left| \sum_{k \in F} x_k(n) \right| \tag{22}$$

$$P_{1st,LT}(n) = \begin{cases} \beta_{1st,LT,1} P_{1st,LT}(n-1) + \alpha_{1st,LT,1} \left| \sum_{k \in F} x_k(n) \right|, & \text{if } P_{1st,LT}(n) < P_{1st,ST}(n) \\ \beta_{1st,LT,2} P_{1st,LT}(n-1) + \alpha_{1st,LT,2} \left| \sum_{k \in F} x_k(n) \right|, & \text{if } P_{1st,LT}(n) \geq P_{1st,ST}(n) \end{cases} \tag{23}$$

where F represents the set of frequency bands within the first formant region. The first formant region is preferred because it contains a large proportion of the speech energy and provides a suitable means for early detection of the beginning of a speech burst.

The long-term power measure tracks the background noise level in the first formant of the signal. The short-term power measure tracks the speech signal level in first formant of the signal. Suitable parameters for the long-term and short-term first formant power measures are:

$$\alpha_{1st,LT,1} = 1/16000 \tag{24a}$$

$$\beta_{1st,LT,1} = 1 - \alpha_{1st,LT,1} \tag{24b}$$

$$\alpha_{1st,LT,2} = 1/256 \tag{24c}$$

$$\beta_{1st,LT,2} = 1 - \alpha_{1st,LT,2} \tag{24d}$$

$$\alpha_{1st,ST} = 11/128 \tag{24e}$$

$$\beta_{1st,ST} = 1 - \alpha_{1st,ST} \tag{24f}$$

The VAD 304 also may utilize a hangover counter, $h_{VAD}$ 305. The hangover counter 305 is used to hold the state of the VAD output 320 steady during short periods when the power in the first formant drops to low levels. The first formant power can drop to low levels during short stoppages and also during consonant sounds in speech. The VAD output 320 is held steady to prevent speech from being inadvertently suppressed. The hangover counter 305 may be updated as follows:

$$h_{VAD} = \begin{cases} h_{VAD,max} & \text{if } P_{1st,ST}(n) > \mu P_{1st,LT}(n) + P_0 \\ \max[0, h_{VAD} - 1] & \text{otherwise} \end{cases} \quad (25)$$

where suitable values for the parameters (when the range of x(n) is normalized to ±1) are, for example:

$$\mu=1.75 \quad (26)$$

$$P_0=16/8159 \quad (27)$$

The value of $h_{VAD,max}$ preferably corresponds to about 150-250 ms, i.e. $h_{VAD,max} \epsilon [1200,2000]$. Speech is considered active (VAD=1) whenever the following condition is satisfied:

$$h_{VAD}>0 \quad (28)$$

Otherwise, speech is considered to be not present in the input signal (VAD=0).

The preferred apparatus and method for detection of DTMF tones, in the JVADAD for example, will now be discussed. Although the preferred embodiment uses an apparatus and method for detecting DTMF tones, the principles discussed with respect to DTMF tones are applicable to all inband signals. In this context, an inband signal is any kind of tonal signal within the bandwidth normally used for voice transmission. Exemplary inband signals include facsimile tones, DTMF tones, dial tones, and busy signal tones.

Given a block of N samples (where N is chosen appropriately) of the input signal, u(n), n=0, 1, 2, . . . N−1, the apparatus can test for the presence of a tone close to a particular frequency, $\omega_0$, by correlation of the input samples with a pair of tones in quadrature at the test frequency $\omega_0$. The correlation results can be used to estimate the power of the input signal 316 around the test frequency. This procedure can be expressed by the following equations:

$$R_{\omega_0=\Sigma n=0}^{N-1} u(n)\cos \omega_0 n \quad (29)$$

$$I_{\omega_0=\Sigma n=0}^{N-1} u(n)\sin \omega_0 n \quad (30)$$

$$P_{\omega_0}=R_{\omega_0}^{2}+I_{\omega_0} \quad (31)$$

Equation (3) provides the estimate of the power, $P_{\omega_0}$, around the test frequency $\omega_0$. The computational complexity of the procedure stated in (29)-(31) can be reduced by about half by using a modified Goertzel algorithm. This is given below:

$$w(n)=2\cos \omega_0 w(n-1)-w(n-2)+u(n),\ n=0, 1, 2, \ldots N-1 \quad (32)$$

$$w(N)=2\cos \omega_0 w(N-1)-w(N-2) \quad (33)$$

$$P_{\omega_0}=w^2(N)+w^2(N-1)-2\cos \omega_0 w(N)w(N-1) \quad (34)$$

Note that the initial conditions for the recursion in (32) are w(−1)=w(−2)=0.

The above procedure in equations (32)-(34) is preferably performed for each of the eight DTMF frequencies and their second harmonics for a given block of N samples. The second harmonics are the frequencies that are twice the values of the DTMF frequencies. These frequencies are tested to ensure that voiced speech signals (which have a harmonic structure) are not mistaken for DTMF tones. The Goertzel algorithm preferably analyzes blocks of length N=102 samples. At a preferred sampling rate of 8 kHz, each block contains signals of 12.75 ms duration. The following validity tests are preferably conducted to detect the presence of a valid DTMF tone pair in a block of N samples:

(1) The power of the strongest Low Group frequency and the strongest High Group frequency must both be above certain thresholds.

(2) The power of the strongest frequency in the Low Group must be higher than the other three power values in the Low Group by a certain threshold ratio.

(3) The power of the strongest frequency in the High Group must be higher than the other three power values in the High Group by a certain threshold ratio.

(4) The ratio of the power of the strongest Low Group frequency and the power of the strongest High Group frequency must be within certain upper and lower bounds.

(5) The ratio of the power values of the strongest Low Group frequency and its second harmonic must exceed a certain threshold ratio.

(6) The ratio of the power values of the strongest High Group frequency and its second harmonic must exceed a certain threshold ratio.

If the above validity tests are passed, a further confirmation test may be performed to ensure that the detected DTMF tone pair is stable for a sufficient length of time. To confirm the presence of a DTMF tone pair, the same DTMF tone pair must be detected to confirm that a valid DTMF tone pair is present for a sufficient duration of time following a block of silence according to the specifications used, for example, for three consecutive blocks (of approximately 12.75 ms).

To provide improved detection of DTMF tones, a modified Goertzel detection algorithm is preferably used. This is achieved by taking advantage of the filter bank 302 in the noise suppression apparatus 300 which already has the input signal split into separate frequency bands. When the Goertzel algorithm is used to estimate the power near a test frequency, $\omega_0$, it suffers from poor rejection of the power outside the vicinity of $\omega_0$. In the improved apparatus 300, in order to estimate the power near a test frequency $\omega_0$, the apparatus 300 uses the output of the bandpass filter whose passband contains $\omega_0$. By applying the Goertzel algorithm to the band-passed signals, excellent rejection of power in frequencies outside the vicinity of $\omega_0$ is achieved.

Note that the apparatus 300 preferably uses the validity tests as described above in, for example, the JVADAD 304. The apparatus 300 may or may not use the confirmation test as described above. In the preferred embodiment, a more sophisticated method (than the confirmation test) suitable for the purpose of DTMF tone extension or regeneration is used. The validity tests are preferably conducted in the DTMF Activity Detection portion of the Joint Voice Activity & DTMF Activity Detector 304.

A method and apparatus for real-time extension of DTMF tones will now be discussed in connection with FIGS. 5 and 8. Although the preferred embodiment uses an apparatus and method for extending DTMF tones, the principles discussed with respect to DTMF tones are applicable to all inband signals. In this context, an inband signal is any kind of tonal signal within the bandwidth normally used for voice transmission. Exemplary inband signals include facsimile tones, DTMF tones, dial tones, and busy signal tones.

Figure 8:
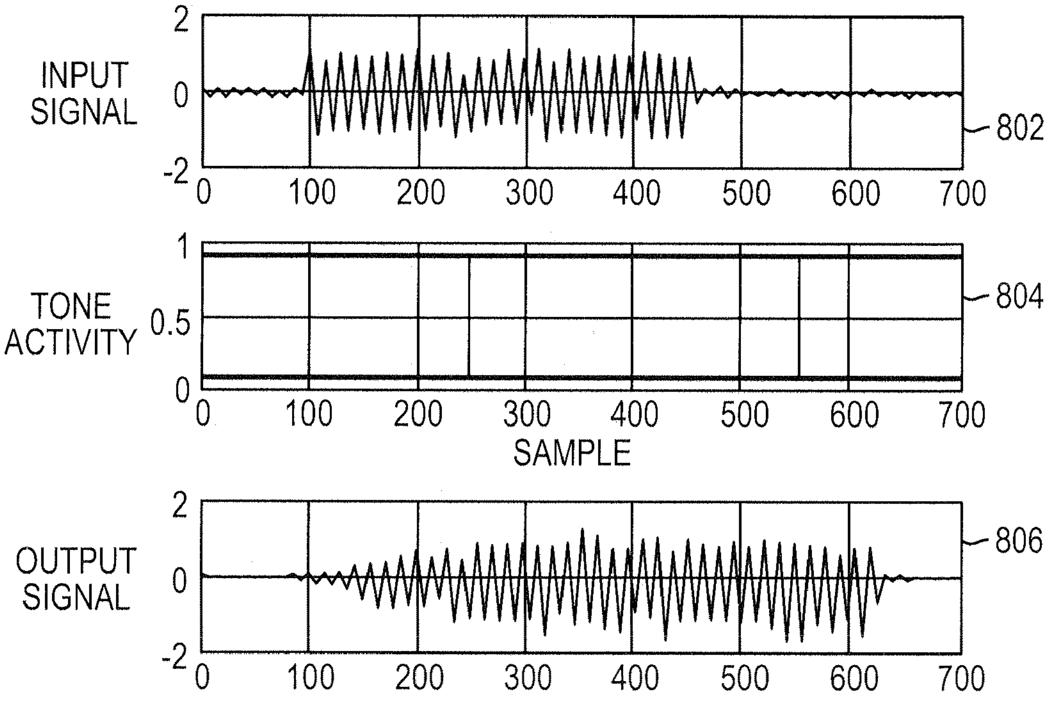
FIG. 8 presents graphs illustrating the real-time extension of DTMF tones.

Referring to FIG. 8, which illustrates the concept of extending a tone in real time, the input signal 802 tone starts at around sample 100 and ends at around sample 460, lasting about 45 ms. The tone activity flag 804, shown in the middle graph, indicates whether a tone was detected in the last block of, for example, N=102 samples. This flag is zero until sample

250 at which point it rises to one. This means that the block from sample 149 to sample 250 was tested and found to contain tone activity. Note that the previous block from sample 47 to sample 148 was tested and found not to contain tone activity although part of the block contained the input tone (the percentage of a block that must contain a DTMF tone for the tone activity flag to detect a tone may be set to a predetermined threshold, for example). This block is considered to contain a pause. The next two blocks of samples were also found to contain tone activity at the same frequency. Thus, three consecutive blocks of samples contain tone activity following a pause which confirms the presence of a tone of the frequency that is being tested for. (Note that, in the preferred embodiment, the presence of a low group tone and a high group tone must be simultaneously confirmed to confirm the DTMF activity).

The output signal 806 shows how the input tone is extended even after the input tone dies off at about sample 460. This extension of the tone is performed in real-time and the extended tone preferably has the same phase, frequency and amplitude as the original input tone.

The preferred method extends a tone in a phase-continuous manner as discussed below. In the preferred embodiment, the extended tone will continue to maintain the amplitude of the input tone. The preferred method takes advantage of the information obtained when the Goertzel algorithm is used for DTMF tone detection. For example, given an input tone:

$$u(n)=A_0 \sin(\omega_0 i+\phi) \tag{35}$$

Equations (32) and (33) of the Goertzel algorithm can be used to obtain the two states w(N−1) and w(N). For sufficiently large values of N, it can be shown that the following approximations hold:

$$w(N-1) = B_0 \sin(N\omega_0 + \phi - \pi/2) \tag{36}$$

$$w(N) = B_0 \sin((N+1)\omega_0 + \phi - \pi/2) \tag{37}$$

where $$B_0 = \frac{A_0}{\sin\omega_0} \sum_{i=0}^{N-1} \sin^2(\omega_0 i) \tag{38}$$

It is seen that w(N−1) and w(N) contain two consecutive samples of a sinusoid with frequency $\omega_0$. The phase and amplitude of this sinusoid preferably possess a deterministic relationship to the phase and amplitude of the input sinusoid u(n). Thus, the DTMF tone generator 321 can generate a sinusoid using a recursive oscillator that matches the phase and amplitude of the input sinusoid u(n) for sample times greater than N using the following procedure:

(a) Compute the next consecutive sample of the sinusoid with amplitude $B_0$:

$$w(N+1)=(2\cos\omega_0)w(N)-w(N-1) \tag{39}$$

(b) Generate two consecutive samples of a sinusoid, w'(n), with amplitude $A_0$ and phase $\phi$ using w(N−1), w(N) and w(N+1):

$$w'(N+1) = \frac{\cos\omega_0}{\sin\omega_0} w(N) - \frac{1}{\sin\omega_0} w(N-1) \tag{40}$$

$$w'(N+2) = \frac{\cos\omega_0}{\sin\omega_0} w(N+1) - \frac{1}{\sin\omega_0} w(N) \tag{41}$$

(c) Use a recursive oscillator to generate all consecutive samples of the sinusoid for j=3, 4, 5, . . .

$$w'(N+j)=(2\cos\omega_0)w'(N+j-1)-w'(N+j-2) \tag{42}$$

The sequence w'(N+j), j=1, 2, 3, 4, 5, . . . can be used to extend the input sinusoid u(n) beyond the sample N.

As soon as the two DTMF tone frequencies are determined by the DTMF activity detector, for example, the procedure in equations (39)-(42) can be used to extend each of the two tones. The extension of the tones will be performed by a weighted combination of the input signal with the generated tones. A weighted combination is preferably used to prevent abrupt changes in the amplitude of the signal due to slight amplitude and/or frequency mismatch between the input tones and the generated tones which produces impulsive noise. The weighted combination is preferably performed as follows:

$$y(n)=[1-\rho(n)]u(n)+\rho(n)[w'_L(n)+w'_H(n)],\ n=N+1,\ N+2,\ N+3, \tag{43}$$

where u(n) is the input signal, $w'_L(n)$ is the low group generated tone, $w'_H(n)$ is the high group generated tone, and $\rho(n)$ is a gain parameter that increases linearly from 0 to 1 over a short period of time, preferably 5 ms or less.

In the noise suppression system, x(n) is the input sample at time n to the resonator bank 302. The resonator bank 302 splits this signal into a set of bandpass signals $\{x_k(n)\}$. Recalling equation (4) from above:

$$y(n)=\Sigma_k G_k(n)x_k(n) \tag{44}$$

As discussed above, $G_k(n)$ and $x_k(n)$ are the gain factor and bandpass signal from the $k^{th}$ frequency band, respectively, and y(n) is the output of the noise suppression apparatus 300. The set of bandpass signals $\{x_k(n)\}$ collectively may be referred to as the input signal to the DTMF tone extension method.

Note that there is no block delay introduced by the noise suppression apparatus 300 when DTMF tone extension is used because the current input sample to the noise suppression apparatus 300 is processed and output as soon as it is received. Since the DTMF detection method works on blocks of N samples, we will define the current block of N samples as the last N samples received, i.e., samples {x(n−N), x(n−N+1), . . . , x(n−1)}. The previous block will consist of the samples {x(n−2N), x(n−2N+1), . . . , x(n−N−1)}.

Figure 5:
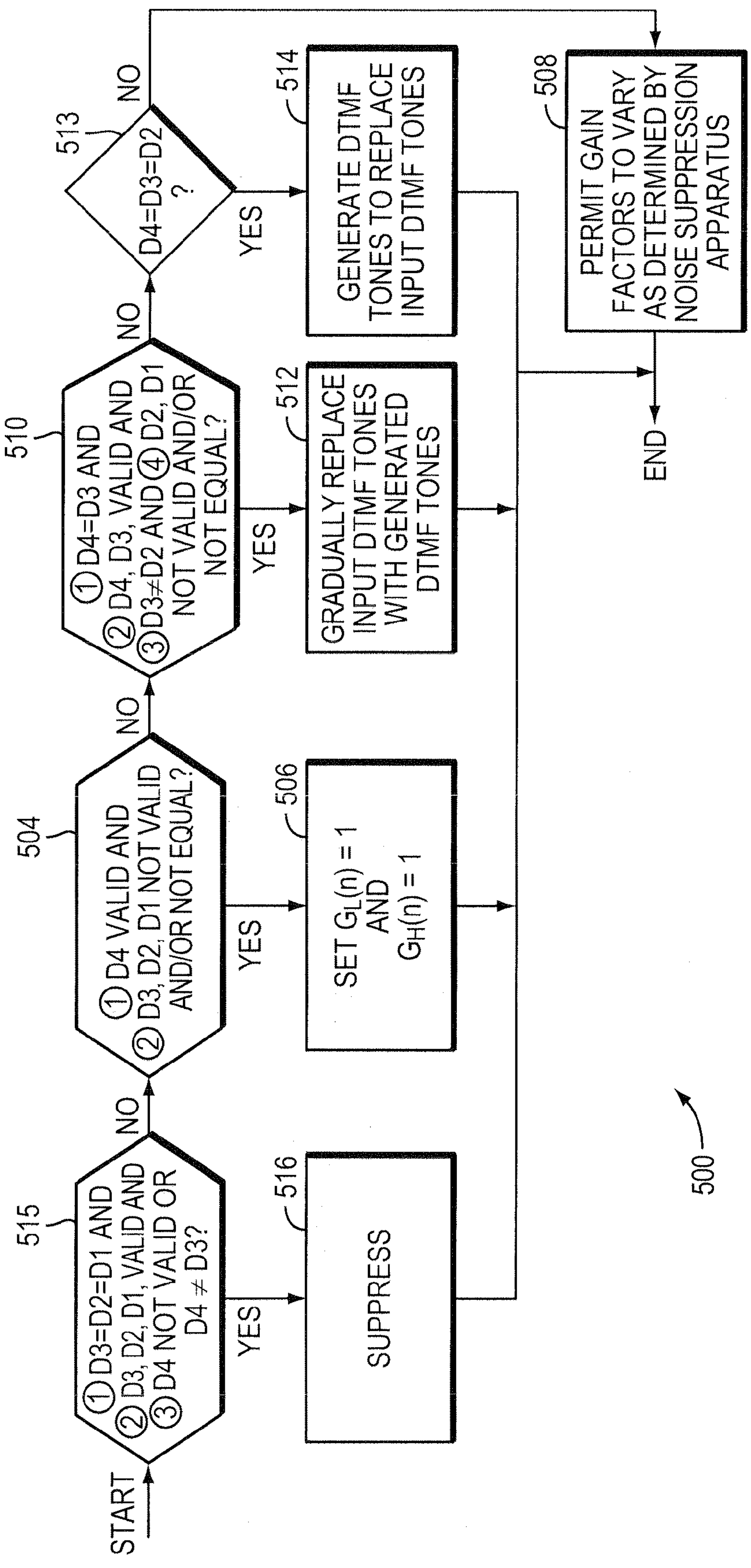
FIG. 5 presents a flow chart depicting a method for extending DTMF tones according to a particular embodiment of the present invention.

Turning now to FIG. 5, that Figure presents an exemplary method 500 for extending DTMF tones. To determine whether DTMF tones are present, the validity tests of the DTMF detection method are preferably applied to each block. If a valid DTMF tone pair is detected, the corresponding digit is decoded based on Table 1. In the preferred embodiment, the decoded digits that are output from the DTMF activity detector (for example the JVADAD) for the current and three previous output blocks are used. In this context, the ith output of DTMF activity detector is Di, with larger i corresponding to a more recent output. Thus, the four output blocks will be referred to as Di (i.e., D1, D2, D3 and D4). In the preferred embodiment, each output block can have seventeen possible values: the sixteen possible values from the extended keypad and a value indicating that no DTMF tone is present. The output blocks Di may be transmitted to the DTMF tone generator 321 in the voice activity detection and DTMF activity detection signal 320. The following decision Table (Table 3) is preferably used to implement the DTMF tone extension method 500:

TABLE 3

| Extension of DTMF Tones | |
|---|---|
| Condition | Action |
| (D3 = D2 = D1) and (D3, D2, D1 valid) and ((D4 not valid) or (D4 ≠ D3)) | Suppress next 3 consecutive blocks |
| (D4 valid) and (D3, D2, D1 not valid and/or not equal) | Set $G_L(n) = 1$ and $G_H(n) = 1$ |
| (D4 = D3) and (D4, D3 valid) and (D3 ≠ D2) and (D2, D1 not valid and/or not equal) | Replace next block gradually with generated DTMF tones using equation (46) |
| (D4 = D3 = D2) | Generate DTMF tones to replace the transmitted tones |
| All other cases | All gain factors allowed to vary as determined by noise suppression apparatus |

When the first block containing a valid DTMF tone pair is detected, two gain factors of the noise suppression system, $G_L(n)$ and $G_H(n)$ corresponding to the $L^{th}$ and $H^{th}$ frequency bands containing the low group and high group tones, respectively, are set to one, for example, in equation (4), i.e.

$$y(n)=\Sigma_k G_k(n)x_k(n),\ G_L(n)=1,\ G_H(n)=1 \quad (45)$$

This corresponds to steps 504 and 506 of FIG. 5. Setting these gain factors to one ensures that the noise suppression apparatus 300 does not suppress the DTMF tones after this point. After this block, if the next one or two blocks do not result in the same decoded digit, the gain factors are allowed to vary again as determined by the noise suppression system, as indicated by step 508 of FIG. 5.

When the first two consecutive blocks containing identical valid digits are decoded following a block that does not contain DTMF tones, the appropriate pair of tones corresponding to the digit are generated, for example by using equations (39)-(42), and are used to gradually substitute the input tones. This corresponds to steps 510 and 512 of FIG. 5. The DTMF tones 329 are preferably generated in the DTMF tone generator 321. The substitution is preferably performed by reducing the contribution of the input signal, x(n), and increasing the contribution of the generated tones, $w'_L(n)$ and $w'_H(n)$, to the output signal, y(n), over the next M samples (j=1, 2, 3, . . . M) as follows:

$$y(n+j)=[1-\rho(n+j)]\Sigma_k G_k(n)x_k(n)+\rho(n+j)[w'_L(n)+w'_H(n)] \quad (46)$$

$$\rho(n+j)=j/M \quad (47)$$

Note that no division is necessary in equation (47). Beginning with ρ(n)=0, the relation ρ(n+j+1)=ρ(n+j)+1/M can be used to update the gain value each sample. An exemplary value of M is 40.

Thus, in a preferred embodiment, after receiving the first two consecutive blocks with identical valid digits, the first M samples of the next block are gradually replaced with generated DTMF tones 329 so that after the M samples, the output $y(n)=w'_L(n)+w'_H(n)$. After M samples, the generated tones are maintained until a DTMF tone pair is no longer detected in a block. In such a case, the delay in detecting the DTMF tone signal (due to, e.g., the block length) is offset by the delay in detecting the end of a DTMF tone signal. As a result, the DTMF tone is extended through the use of generated DTMF tones 329.

In an alternative embodiment, the generated tones continue after a DTMF tone is no longer detected for example for approximately one-half block after a DTMF tone pair is not detected in a block. In this embodiment, since the JVADAD may take approximately one block to detect a DTMF tone pair, the DTMF tone generator extends the DTMF tone approximately one block beyond the actual DTMF tone pair. Thus, in the unlikely event that a DTMF tone pair is the minimum detectable length, the DTMF tone output should be at least the length of the minimum input tone. Whatever embodiment is utilized, the length of time it takes for the DTMF tone pair to be detected can vary based on the JVADAD's detection method and the block length used. Accordingly, the proper extension period may vary as well.

When three or more consecutive blocks contain valid digits, the DTMF tone generator 321 generates DTMF tones 329 to replace the input DTMF tones. This corresponds to steps 513 and 514 of FIG. 5. Once the DTMF tone generator has extended the DTMF tone pair, the input signal is attenuated for a suitable time, for example for approximately three consecutive 12.75 ms blocks, to ensure that there is a sufficient pause following the output DTMF signal. This corresponds to steps 515 and 516 of FIG. 5. During the period of attenuation, the output is given by $$y(n)=\rho(n)\Sigma_k G_k(n)x_k(n) \quad (48)$$

where ρ(n)=0.02 is a suitable choice. After the three blocks, ρ(n)=1, and the noise suppression apparatus is allowed to determine the gain factors until DTMF activity is detected again (as indicated by step 508 of FIG. 5).

Note that it is possible for the current block to contain DTMF activity although the current block is scheduled to be suppressed as in equation (48). This can happen, for instance, when DTMF tone pairs are spaced apart by the minimum allowed time period. If the input signal 316 contains legitimate DTMF tones, then the digits will normally be spaced apart by at least three consecutive blocks of silence. Thus, only the first block of samples in a valid DTMF tone pair will generally suffer suppression. This will, however, be compensated for by the DTMF tone extension.

Figure 6:
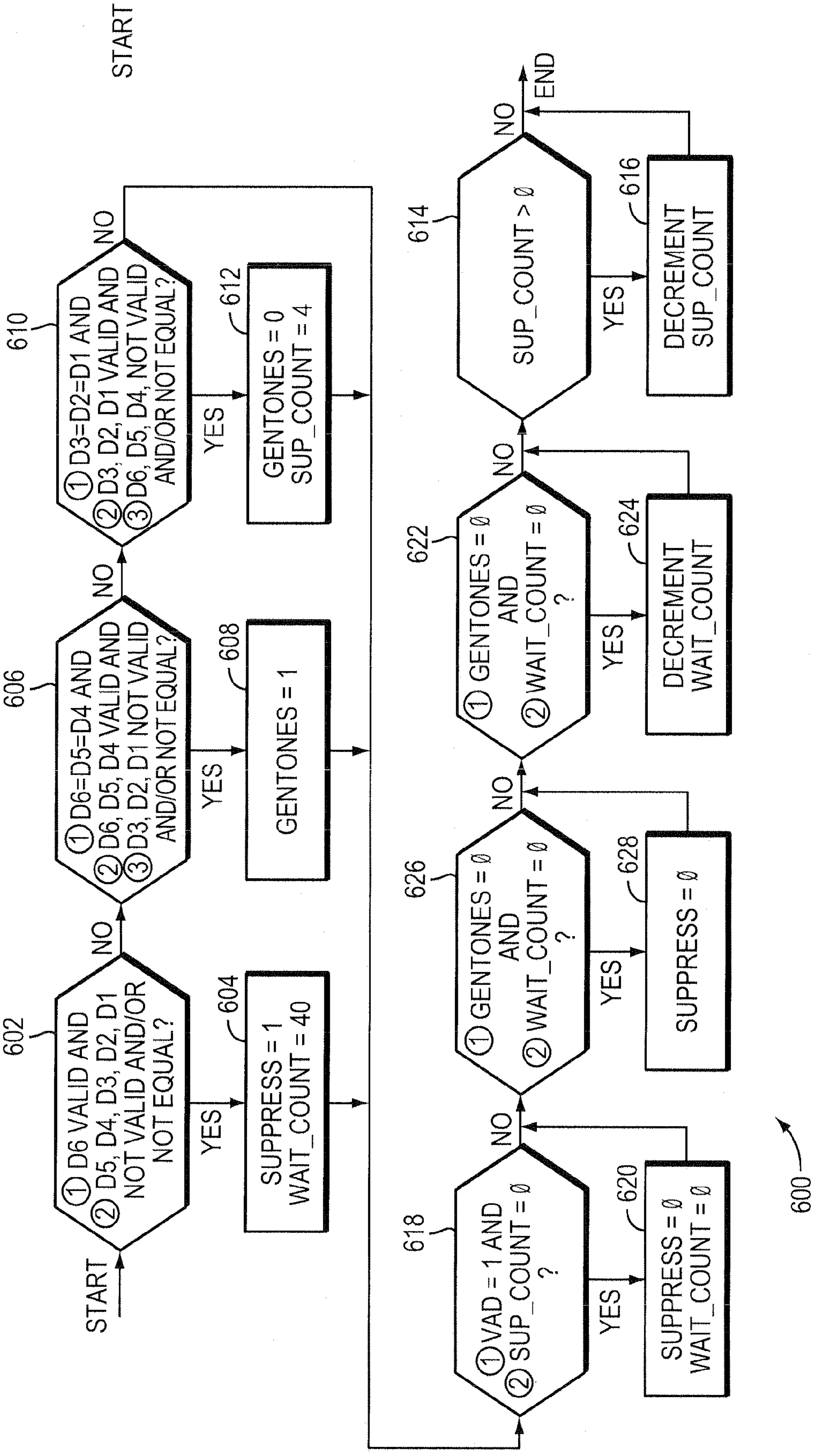
FIG. 6 presents a flow chart depicting a method for regenerating DTMF tones according to a particular embodiment of the present invention.
Figure 7:
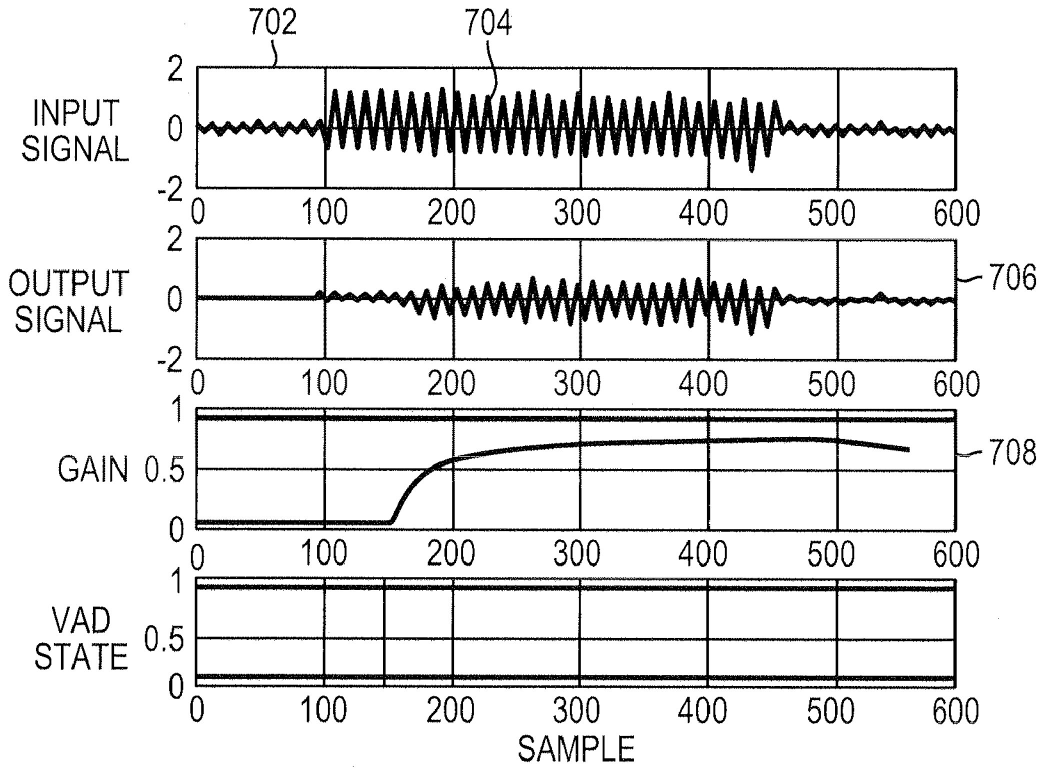
FIG. 7 presents graphs illustrating the suppression of DTMF tones in speech enhancement systems.

Turning now to FIG. 6, that figure presents a method for regenerating DTMF tones 329. DTMF tone regeneration is an alternative to DTMF tone extension. Although the preferred embodiment uses an apparatus and regenerating DTMF tones, the principles discussed with respect to DTMF tones are applicable to all inband signals. In this context, an inband signal is any kind of tonal signal within the bandwidth normally used for voice transmission. Exemplary inband signals include facsimile tones, DTMF tones, dial tones, and busy signal tones.

DTMF tone regeneration may be performed, for example, in the DTMF tone generator 321. The extension method introduces very little delay (approximately one block in the illustrated embodiment) but is slightly more complicated because the phases of the tones are matched for proper detection of the DTMF tones. The regeneration method introduces a larger delay (a few blocks in the illustrated embodiment) but is simpler since it does not require the generated tones to match the phase of the input tones. The delay introduced in either case is temporary and happens only for DTMF tones. The delay causes a small amount of the signal following DTMF tones to be suppressed to ensure sufficient pauses following a DTMF tone pair. DTMF regeneration may also cause a single block of speech signal following within a second of a DTMF tone pair to be suppressed. Since this is a highly improbable event and only the first N samples of speech suffer the suppression, however, no loss of useful information is likely.

As when performing DTMF extension, however, the set of signals $\{x_k(n)\}$ may be referred to collectively as the input to the DTMF Regeneration method. When DTMF tones 329 are generated, the output signal of the combiner 315 is:

$$y(n)=\rho_1(n)\Sigma_k G_k(n)+\rho_2(n)[w'_L(n)+w'_H(n)] \quad (49)$$

where $\Sigma_k G_k x_k(n)$ is the output of the gain multiplier, $w'_L(n)$ and $w'_H(n)$ are the generated low and high group tones (if any), and $\rho_1(n)$ and $\rho_2(n)$ are additional gain factors. When no DTMF signals are present in the input signal, $\rho_1(n)=1$ and $\rho_2(n)=0$. During the regeneration of a DTMF tone pair, $\rho_2(n)=1$. If the input signal is to be suppressed (either to ensure silence following the end of a regenerated DTMF tone pair or during the regeneration of the DTMF tone pair), then $\rho_1(n)$ is set to a small value, e.g., $\rho_1(n)=0.02$. Preferably two recursive oscillators 332 are used to regenerate the appropriate low and high group tones corresponding to the decoded digit.

With continued reference to FIG. 6, in an exemplary embodiment, regeneration of the DTMF tones uses the current and five previous output blocks from the DTMF tone activity detector (e.g., in the JVADAD), two flags, and two counters. The previous five and the current output blocks can be referred to as D1, D2, D3, D4, D5, and D6, respectively. The flags, the SUPPRESS flag and the GENTONES flag are described below in connection with the action they cause the DTMF tone generator 321, combiner 315, and/or the gain multiplier 314 to undertake:

| SUPPRESS | Action |
|---|---|
| 1 | Suppress the output of the noise suppression apparatus by setting $\rho_1(n)$ to a small value, e.g., $\rho_1(n) = 0.02$ in equation (49) |
| 0 | Set $\rho_1(n) = 1$ |

| GENTONES | Action |
|---|---|
| 1 | Generate DTMF tones and output them by setting $\rho_2(n) = 1$ |
| 0 | Stop generating DTMF tones and set $\rho_2(n) = 0$ |

| Counter | Purpose |
|---|---|
| wait_count | Counts down the number of blocks to be suppressed from the point where a DTMF tone pair was first detected |
| sup_count | counts down the number of blocks to be suppressed from the end of a DTMF tone pair regeneration |

At initialization, all flags and counters are preferably set to zero. The following Table (Table 4) illustrates an exemplary embodiment of the DTMF tone regeneration method 600:

TABLE 4

DTMF Tone Regeneration

| Condition | Action |
|---|---|
| (D6 valid) and (D5, D4, D3, D2, D1 are not valid and/or not equal) | SUPPRESS = 1<br>wait_count = 40 |
| (D6 = D5 = D4) and (D6, D5, D4 valid) and (D3, D2, D1 not valid and/or not equal) | GENTONES = 1 |
| (D3 = D2 = D1) and (D3, D2, D1 valid) and (D6, D5, D4 not valid and/or not equal) | GENTONES = 0<br>sup_count = 4 |
| (VAD = 1) and (sup_count = 0) | SUPPRESS = 0<br>wait_count = 0 |
| (GENTONES = 0) and (wait_count = 0) | SUPPRESS = 0 |
| (GENTONES = 0) and (wait_count > 0) | Decrement wait_count |
| sup_count > 0 | Decrement sup_count |

Note that the conditions in Table 4 are not necessarily mutually exclusive. Thus, in the preferred embodiment, each condition is checked in the order presented in Table 4 at the end of a block (with the exception of conditions 1-3, which are mutually exclusive). The corresponding action is then taken for the next block if the condition is true. Therefore, multiple actions may be taken at the beginning of a block. As with DTMF tone extension, preferably N=102 is used for DTMF tone detection for use with the DTMF tone regeneration apparatus and method.

A description of the preferred tone regeneration method will now be presented. When a valid DTMF pair is first detected in a block of N samples, the output of the noise suppression system is suppressed by setting $\rho_1(n)$ to a small value, e.g., $\rho_1(n)=0.02$. This is indicated by the first condition in Table 4 being satisfied and the SUPPRESS flag being set to a value of 1, and corresponds to steps 602 and 604 of FIG. 6. After three consecutive blocks are found to contain the same valid digit, the DTMF tones, $w'_L(n)$ and $w'_H(n)$, corresponding to the received digit are generated and are fed to the output, i.e. $\rho_1(n)=0.02$ and $\rho_2(n)=1$. This corresponds to the second condition of Table 4 being satisfied and the GENTONES flag being set to 1, and steps 606 and 608 of FIG. 6. The DTMF tone regeneration preferably continues until after the input DTMF pair is not detected in the current block. The generated DTMF tones 329 may be continuously output for a sufficient time (after the DTMF pair is no longer detected in the current block), for example for a further three or four blocks (to ensure that a sufficient duration of the DTMF tones are sent).

As with the DTMF tone extension method, the DTMF tone regeneration may take place for an extra period of time, for example one-half of a block or one block of N samples, to ensure that the DTMF tones meet minimum duration standards. In the embodiment illustrated in Table 4, the DTMF tones 329 are generated for 3 blocks after the DTMF tones are no longer detected. This corresponds to condition 3 of Table 4 being satisfied, and steps 610 and 612 of FIG. 6. Note that although sup-count is set to 4 when 3 consecutive non-DTMF blocks follow 3 consecutive valid, identical DTMF blocks, sup-count is decremented in steps 614 and 616 before any blocks are suppressed (thus 3 blocks are suppressed, not 4). After this, a silent period of sufficient duration is transmitted, i.e., $\rho_1(n)=0.02$ and $\rho_2(n)=0$. This may be, for example, four 12.75 ms blocks long.

Meanwhile, the DTMF activity detector (preferably as part of the JVADAD) continues to operate during the transmission of the regenerated tones and the silence. If a valid digit is received while the last block of the regenerated DTMF tones 329 and/or the silence is being transmitted, the appropriate DTMF tones corresponding to this digit are generated and transmitted after the completion of the silent period. If no valid digits are received during this period, the output continues to be suppressed during a waiting period. During this waiting period, if either of the flags of the JVADAD are one, i.e. VAD=1 or DTMF=1, then the waiting period is immediately terminated. If the waiting period is terminated due to speech activity (VAD=1), the output is determined by the noise suppression system with $\rho_1(n)=1$ and $\rho_2(n)=0$, for example by setting the SUPPRESS flag equal to 0 (as indicated if condition 4 of Table 4 is satisfied). If the waiting period is terminated by DTMF activity (DTMF=1), then suppression of the input signal continues, for example by setting the SUPPRESS flag equal to 1 (as indicated if condition 1 of Table 4 is satisfied). A condition of VAD=1 corresponds to steps 618 and 620 of FIG. 6 while a condition of DTMF=1 corresponds to steps 602 and 604 of FIG. 6. Exemplary waiting periods are from about half a second to a second (about 40 to 80 blocks). The waiting period is used to prevent the leakage of short amounts of DTMF tones from the input signal. The use of wait_count facilitates counting down the number of blocks to be suppressed from the point where a DTMF tone pair is first detected. This corresponds to steps 622 and 624 of FIG. 6.

When no DTMF signals are present, $\rho_1(n)=1$ and $\rho_2(n)=0$. In the current embodiment, whenever a DTMF tone pair is detected in a block, the output of the noise suppression system is suppressed, for example by setting $\rho_1(n)$ to a small value, e.g., $\rho_1(n)=0.02$. In the embodiment disclosed in Table 4, $\rho_1(n)$ is set to a small value by setting SUPPRESS equal to 1. At the end of each block of N samples, if SUPPRESS is equal to 1, then for the next N samples, $\rho_1(n)=0.02$. At the end of each block, if it is determined that the DTMF tones should be regenerated during the next block (for example if GEN-TONES=1), then $\rho_2(n)=1$. The tone generator 321 uses wait_count and the flags from the JVADAD to determine whether to continue suppression of the input signal during the waiting period. If neither a voice nor a DTMF tone is detected during the waiting period, then wait_count is eventually decremented to 0, then the default condition of $\rho_1(n)=1$ and $\rho_2(n)=0$ is preferably set (corresponding to steps 626 and 628 of FIG. 6).

The DTMF tone extension and DTMF tone regeneration methods are described separately. However, it is possible to combine DTMF tone extension and DTMF tone regeneration into one method and/or apparatus.

Although the DTMF tone extension and regeneration methods disclosed here are with a noise suppression system, these methods may also be used with other speech enhancement systems such as adaptive gain control systems, echo cancellation, and echo suppression systems. Moreover, the DTMF tone extension and regeneration described are especially useful when delay cannot be tolerated. However, if delay is tolerable, e.g., if a 20 ms delay is tolerable in a speech enhancement system (which may be the case if the speech enhancement system operates in conjunction with a speech compression device), then the extension and/or regeneration of tones may not be necessary. However, a speech enhancement system that does not have a DTMF detector may scale the tones inappropriately. With a DTMF detector present, the noise suppression apparatus and method can detect the presence of the tones and set the scaling factors for the appropriate subbands to unity.

Referring generally to FIGS. 3 and 4, the filter bank 302, JVADAD 304, hangover counter 305, NSR estimator 306, power estimator 308, NSR adapter 310, gain computer 312, gain multiplier 314, compensation factor adapter 402, long term power estimator 308*a*, short term power estimator 308*b*, power compensator 404, DTMF tone generator 321, oscillators 332, undersampling circuit 330, and combiner 315 may be implemented using combinatorial and sequential logic, an ASIC, through software implemented by a CPU, a DSP chip, or the like. The foregoing hardware elements may be part of hardware that is used to perform other operational functions. The input signals, frequency bands, power measures and estimates, gain factors, NSRs and adapted NSRs, flags, prediction error, compensator factors, counters, and constants may be stored in registers, RAM, ROM, or the like, and may be generated through software, through a data structure located in a memory device such as RAM or ROM, and so forth.

While particular elements, embodiments and applications of the present invention have been shown and described, it is understood that the invention is not limited thereto since modifications may be made by those skilled in the art, particularly in light of the foregoing teaching.

What is claimed is:

1. A method for maintaining integrity of an input tonal component of a communication signal comprising:

detecting a presence of the input tonal component;

generating a supplemental tonal component based on the input tonal component;

matching frequency and phase of the supplemental tonal component to frequency and phase of the input tonal component;

validating at least a partial detection of the input tonal component;

generating an output signal to maintain the integrity of the input tonal component based on validation results; and transmitting the output signal.

2. The method of claim 1 wherein the communication signal includes an input speech component and an input tonal component.

3. The method of claim 1 further including combining at least a part of the input tonal component and a part of the supplemental tonal component to generate the output signal upon obtaining validation, the output signal having a time duration greater than a time duration of the input tonal component.

4. The method of claim 1 further including generating the output signal upon obtaining non-validation, the output signal including the communication signal in an unsuppressed state.

5. An apparatus for maintaining integrity of an input tonal component of a communication signal comprising:

a detection module to detect a presence of the input tonal component;

a first generation module to generate a supplemental tonal component based on the input tonal component;

a frequency matching module to match frequency and phase of the supplemental tonal component to frequency and phase of the input tonal component;

a validation module to validate at least a partial detection of the input tonal component;

a second generation module to generate an output signal to maintain the integrity of the input tonal component based on validation results from the validation module; and a transmission module to transmit the output signal.

6. The apparatus of claim 5 wherein the communication signal includes an input speech component and an input tonal component.

7. The apparatus of claim 5 wherein the second generation module is configured to combine at least a part of the input tonal component and a part of the supplemental tonal component to generate the output signal upon obtaining validation from the validation module, the output signal having a time duration greater than a time duration of the input tonal component.

8. The apparatus of claim 5 wherein the second generation module is configured to generate the output signal upon obtaining non-validation from the validation module, the output signal including the communication signal in an unsuppressed state.

9. The method of claim 1 further comprising detecting a frequency and phase of the input tonal component, and wherein matching the frequency and phase includes matching the frequency and phase detected.

10. The method of claim 3 wherein combining at least a part of the input tonal component and a part of the supplemental tonal component to generate the output signal is based on a weighted average combination to maintain the integrity of the input tonal component, the output tonal component having a time duration greater than the input tonal component.

11. The method of claim 1 wherein input tonal component and supplemental tonal component include a dual-tone multi-frequency (DTMF) signal.

12. The method of claim 1 further including processing the input tonal component in blocks of samples.

13. The method of claim 12 further including detecting the presence of the input tonal component after processing a predetermined number of the blocks.

14. The method of claim 12 further including detecting the input tonal component during a first received block of the input tonal component.

15. The apparatus of claim 5 further comprising a second detection module to detect a frequency and phase of the input tonal component and the a frequency matching module further configured to match the frequency and phase using the frequency and phase detected.

16. The apparatus of claim 7 wherein the second generation module is configured to combine at least a part of the input tonal component and a part of the supplemental tonal component to generate the output signal based on a weighted average combination to maintain the integrity of the input tonal component, the output tonal component having a time duration greater than the input tonal component.

17. The apparatus of claim 5 wherein the input tonal component and supplemental tonal component include a dual-tone multi-frequency (DTMF) signal.

18. The apparatus of claim 5 further wherein the apparatus is configured to process the input tonal component in blocks of samples.

19. The apparatus of claim 18 wherein the detection module is configured to detect the presence of the input tonal component after a predetermined number of the blocks have been processed.

20. The apparatus of claim 18 wherein the detection module is configured to detect the input tonal component during a first received block of the input tonal component.

21. A computer-readable medium having stored thereon sequences of instructions, the sequences of instructions including instructions, when executed by a processor, cause the processor to:

detect a presence of the input tonal component;

generate a supplemental tonal component based on the input tonal component;

match frequency and phase of the supplemental tonal component to frequency and phase of the input tonal component;

validate at least a partial detection of the input tonal component;

generate an output signal to maintain the integrity of the input tonal component based on validation results; and transmit the output signal.

* * * * *